(12) United States Patent
Matsumoto

(10) Patent No.: US 12,249,355 B1
(45) Date of Patent: Mar. 11, 2025

(54) MULTI-LAYER NFT FOR HAMR WITH A THERMAL SHUNT CONNECTING THE METAL LAYERS

(71) Applicant: Western Digital Technologies, Inc., San Jose, CA (US)

(72) Inventor: Takuya Matsumoto, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 14 days.

(21) Appl. No.: 18/241,164

(22) Filed: Aug. 31, 2023

(51) Int. Cl.
  *G11B 5/31* (2006.01)
  *G11B 5/48* (2006.01)
  *G11B 5/00* (2006.01)

(52) U.S. Cl.
  CPC .......... *G11B 5/3106* (2013.01); *G11B 5/4866* (2013.01); *G11B 2005/0021* (2013.01)

(58) Field of Classification Search
  CPC ................ G11B 5/3106; G11B 5/4866; G11B 2005/0021
  See application file for complete search history.

(56) References Cited

U.S. PATENT DOCUMENTS

| | | |
|---|---|---|
| 8,514,673 B1 | 8/2013 | Zhao et al. |
| 9,019,803 B1 | 4/2015 | Jin et al. |
| 10,896,690 B1 * | 1/2021 | Bai .................. G11B 5/115 |
| 10,943,613 B1 * | 3/2021 | Hosoi ............. G11B 5/3906 |
| 11,574,647 B1 * | 2/2023 | Yu ................... G11B 5/6088 |
| 11,710,506 B1 | 7/2023 | Peng et al. |
| 11,894,018 B1 * | 2/2024 | Matsumoto ......... G11B 5/314 |

* cited by examiner

*Primary Examiner* — Andrew Sasinowski
(74) *Attorney, Agent, or Firm* — PATTERSON + SHERIDAN, LLP

(57) ABSTRACT

The present disclosure generally relates to a magnetic recording head for a magnetic media drive. The magnetic recording head comprises a main pole, a waveguide disposed adjacent to the main pole, a thermal shunt disposed between the main pole and the waveguide, the thermal shunt being recessed from a media facing surface (MFS), and a near field transducer (NFT) coupled between the main pole and the waveguide at the MFS. The NFT comprises a first metal layer disposed adjacent to the waveguide and in contact with a first insulating layer, a dielectric gap layer disposed on and in contact with the first metal layer, and a second metal layer disposed on and in contact with the dielectric gap layer and a second insulating layer. The first metal layer, the dielectric gap layer, and the second metal layer are each disposed in contact with the thermal shunt.

32 Claims, 16 Drawing Sheets

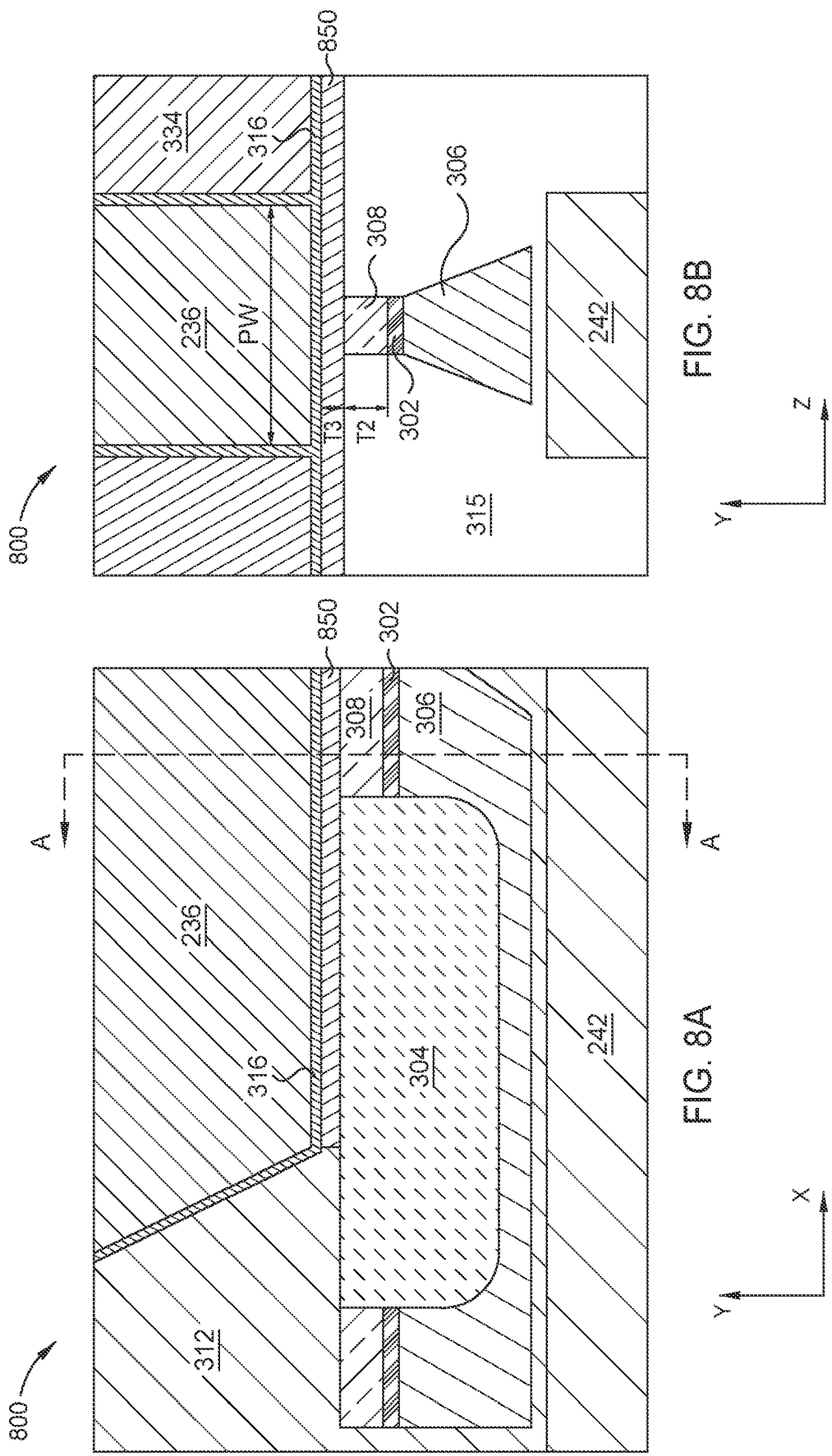

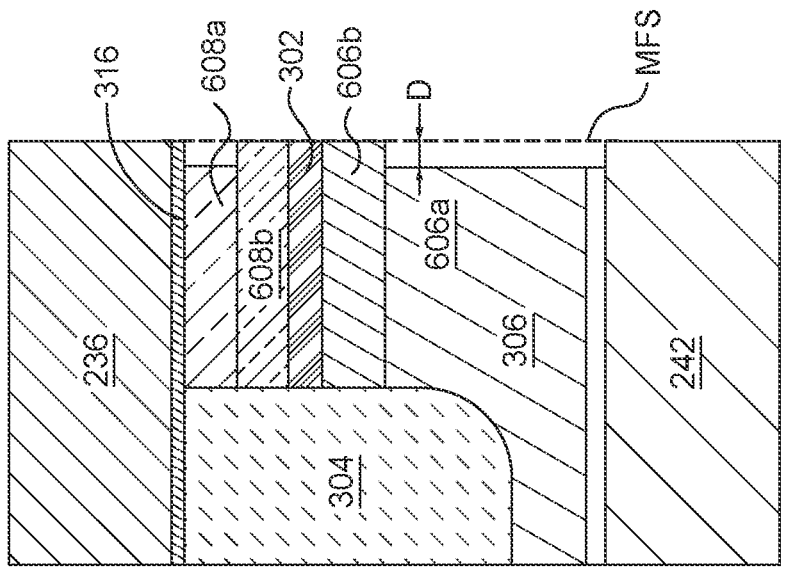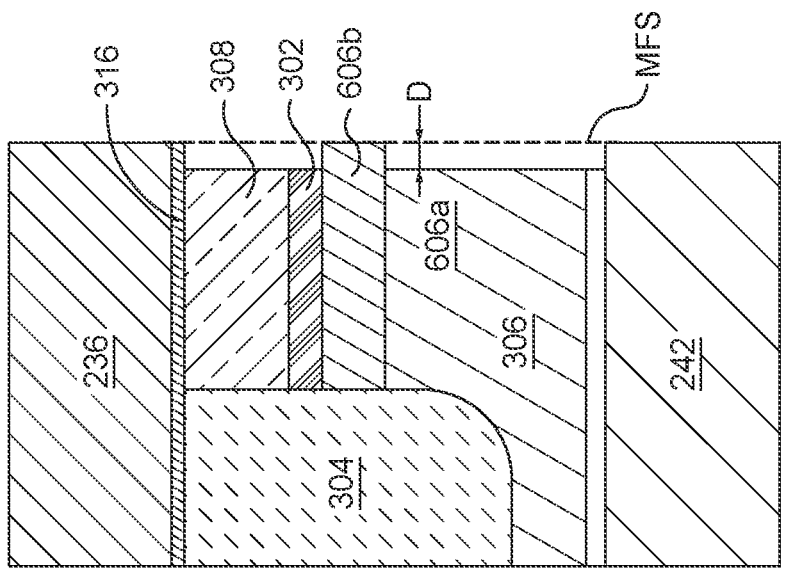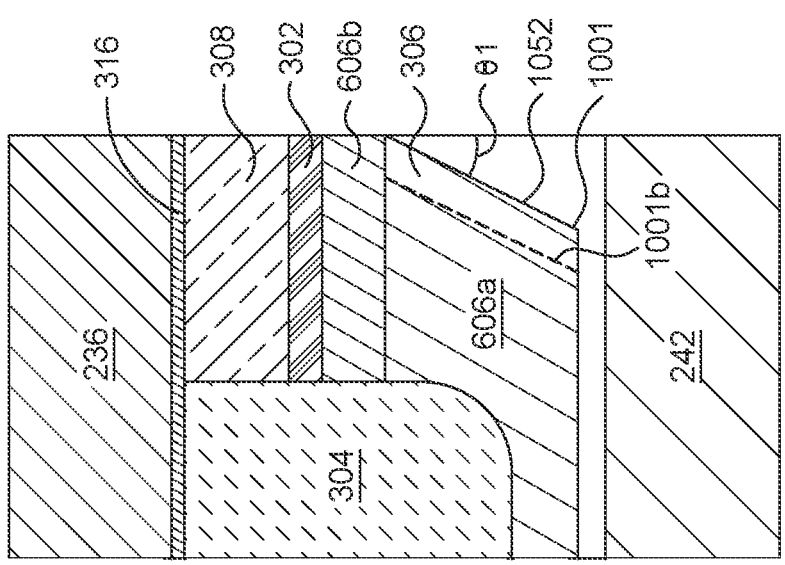

MULTI-LAYER NFT FOR HAMR WITH A THERMAL SHUNT CONNECTING THE METAL LAYERS

BACKGROUND OF THE DISCLOSURE

Field of the Disclosure

Embodiments of the present disclosure generally relate to a magnetic recording head for a magnetic media drive.

Description of the Related Art

The heart of the functioning and capability of a computer is the storing and writing of data to a data storage device, such as a magnetic media drive (e.g., hard disk drive (HDD)). The volume of data processed by a computer is increasing rapidly. There is a need for higher recording density of a magnetic recording medium to increase the function and the capability of a computer.

In order to achieve higher recording densities, such as recording densities exceeding 2 Tbit/in$^2$ for a magnetic recording medium, the width and pitch of write tracks are narrowed, and thus the corresponding magnetically recorded bits encoded in each write track is narrowed. One challenge in narrowing the width and pitch of write tracks is decreasing a surface area of a main pole of the magnetic recording write head at a media facing surface (MFS). As the main pole becomes smaller, the recording field becomes smaller as well, limiting the effectiveness of the magnetic recording write head.

Heat-assisted magnetic recording (HAMR) and microwave assisted magnetic recording (MAMR) are two types of energy-assisted magnetic recording (EAMR) technology to improve the recording density of a magnetic recording medium. In HAMR, a laser source is located next to or near the write element of the magnetic recording write head in order to produce heat, such as a laser source exciting a near-field transducer (NFT) to produce heat at a write location of a magnetic recording medium. Gold is typically used for the NFT material to achieve a high optical efficiency, but the melting point of gold is low and deformation of the NFT is a problem when the NFT is heated for a long term. The NFT temperature is especially high near the point where the optical near-field is generated, and the maximum temperature may reach more than 150 degrees Celsius over the operational temperature of the magnetic disk device, causing the NFT to deform.

Therefore, there is a need in the art for an improved HAMR magnetic media drive.

SUMMARY OF THE DISCLOSURE

The present disclosure generally relates to a magnetic recording head for a magnetic media drive. The magnetic recording head comprises a main pole, a waveguide disposed adjacent to the main pole, a thermal shunt disposed between the main pole and the waveguide, the thermal shunt being recessed from a media facing surface (MFS), and a near field transducer (NFT) coupled between the main pole and the waveguide at the MFS. The NFT comprises a first metal layer disposed adjacent to the waveguide and in contact with a first insulating layer, a dielectric gap layer disposed on and in contact with the first metal layer, and a second metal layer disposed on and in contact with the dielectric gap layer and a second insulating layer. The first metal layer, the dielectric gap layer, and the second metal layer are each disposed in contact with the thermal shunt.

In one embodiment, a magnetic recording head comprises a main pole, a waveguide disposed adjacent to the main pole, a thermal shunt disposed between the main pole and the waveguide, the thermal shunt being recessed from a media facing surface (MFS), and a near field transducer (NFT) coupled between the main pole and the waveguide at the MFS, the NFT comprising: a first metal layer disposed adjacent to the waveguide, a dielectric gap layer disposed on and in contact with the first metal layer, and a second metal layer disposed on and in contact with the dielectric gap layer, wherein the first metal layer and the second metal layer are each disposed in contact with the thermal shunt.

In another embodiment, a magnetic recording head comprises a main pole, a waveguide disposed adjacent to the main pole, a thermal shunt disposed between the main pole and the waveguide, the thermal shunt being recessed from a media facing surface (MFS), a first insulating layer disposed between the waveguide and the thermal shunt, a second insulating layer disposed between the main pole and the thermal shunt at the MFS, and a near field transducer (NFT) coupled between the first insulating layer and the second insulating layer at the MFS, the NFT comprising: a first metal layer disposed in contact with the first insulating layer, a dielectric gap layer disposed on the first metal layer, and a second metal layer disposed on the dielectric gap layer and the second insulating layer, wherein the first metal layer, the dielectric gap layer, and the second metal layer are each disposed in contact with the thermal shunt.

In yet another embodiment, a method of a magnetic recording head, comprises forming a near field transducer (NFT) by depositing a first metal layer, depositing a dielectric gap layer on and in contact with the first metal layer, and depositing a second metal layer on and in contact with the dielectric gap layer, removing portions of each of the first metal layer, the dielectric gap layer, and a second metal layer, wherein the removed portions of each of the first metal layer, the dielectric gap layer, and a second metal layer is at a location recessed from a media facing surface, and depositing a thermal shunt in the removed portions of each of the first metal layer, the dielectric gap layer, and a second metal layer such that the thermal shunt is disposed in contact with the first metal layer, the dielectric gap layer, and the second metal layer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 8A illustrates a cross-sectional view of a HAMR write head, according to another embodiment.

FIG. 8B illustrates a cross-sectional view of a portion of the NFT of the HAMR write head of FIG. 8A along the A-A line, according to one embodiment.

FIGS. 10A-10C illustrate cross-sectional views of the HAMR write head of FIGS. 3A-3C through the line A-A in FIG. 3A, according to various embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a magnetic recording head for a magnetic media drive. The magnetic recording head comprises a main pole, a waveguide disposed adjacent to the main pole, a thermal shunt disposed between the main pole and the waveguide, the thermal shunt being recessed from a media facing surface (MFS), and a near field transducer (NFT) coupled between the main pole and the waveguide at the MFS. The NFT comprises a first metal layer disposed adjacent to the waveguide and in contact with a first insulating layer, a dielectric gap layer disposed on and in contact with the first metal layer, and a second metal layer disposed on and in contact with the dielectric gap layer and a second insulating layer. The first metal layer, the dielectric gap layer, and the second metal layer are each disposed in contact with the thermal shunt.

Figure 1:
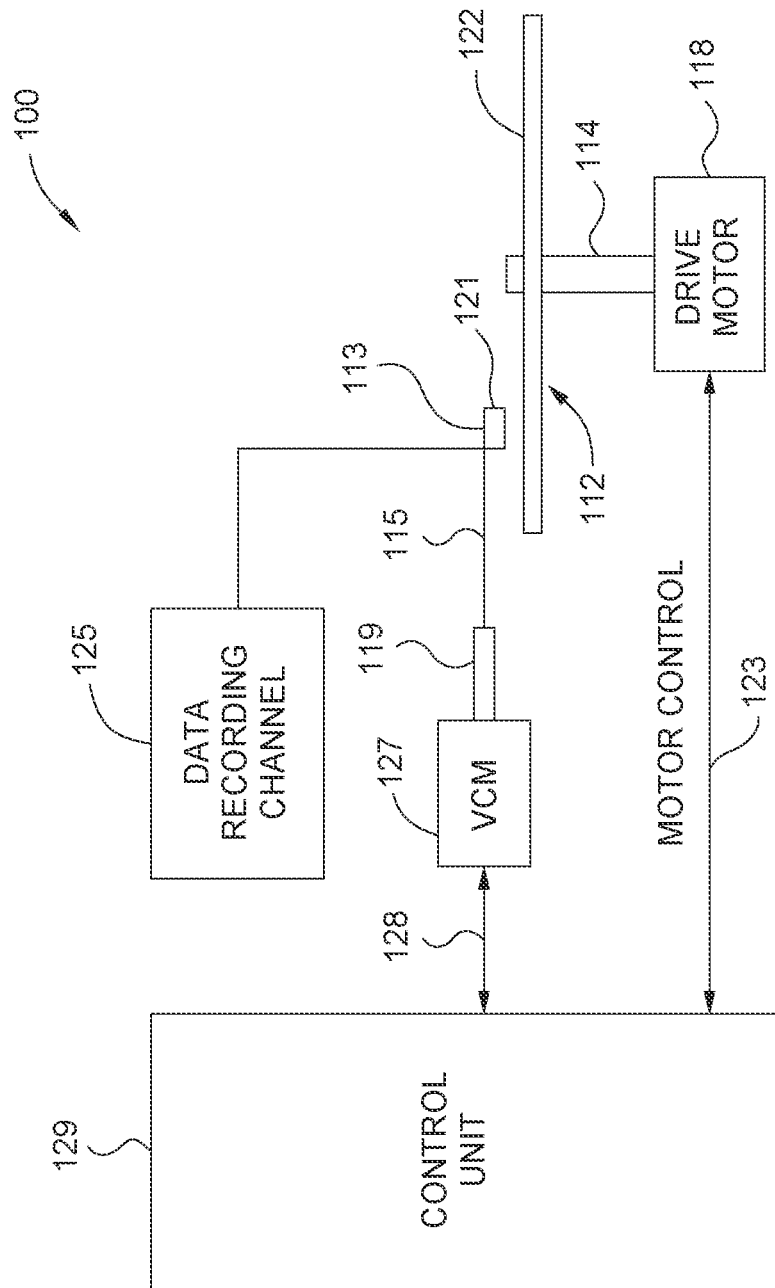
FIG. 1 is a schematic illustration of certain embodiments of a magnetic media drive including a HAMR magnetic write head.

FIG. 1 is a schematic illustration of certain embodiments of a magnetic media drive 100 including an energy-assisted magnetic recording (EAMR) write head, such as a heat-assisted magnetic recording (HAMR). Such magnetic media drive may be a single drive/device or comprise multiple drives/devices. For the ease of illustration, a single disk drive 100 is shown according to one embodiment. The disk drive 100 includes at least one rotatable magnetic recording medium 112 (oftentimes referred to as magnetic disk 112) supported on a spindle 114 and rotated by a drive motor 118. The magnetic recording on each magnetic disk 112 is in the form of any suitable patterns of data tracks, such as annular patterns of concentric data tracks (not shown) on the magnetic disk 112.

At least one slider 113 is positioned near the magnetic disk 112. Each slider 113 supports a head assembly 121 including one or more read heads and one or more write heads such as a HAMR write head. As the magnetic disk 112 rotates, the slider 113 moves radially in and out over the disk surface 122 so that the head assembly 121 may access different tracks of the magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic disk 112 generates an air bearing between the slider 113 and the disk surface 122 which exerts an upward force or lift on the slider 113. The air bearing thus counterbalances the slight spring force of suspension 115 and supports slider 113 off and slightly above the disk surface 122 by a small, substantially constant spacing during normal operation.

The various components of the disk drive 100 are controlled in operation by control signals generated by control unit 129, such as access control signals and internal clock signals. Typically, the control unit 129 comprises logic control circuits, storage means, and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on magnetic disk 112. Write and read signals are communicated to and from the head assembly 121 by way of recording channel 125. Certain embodiments of a magnetic media drive of FIG. 1 may further include a plurality of media, or disks, a plurality of actuators, and/or a plurality number of sliders.

Figure 2:
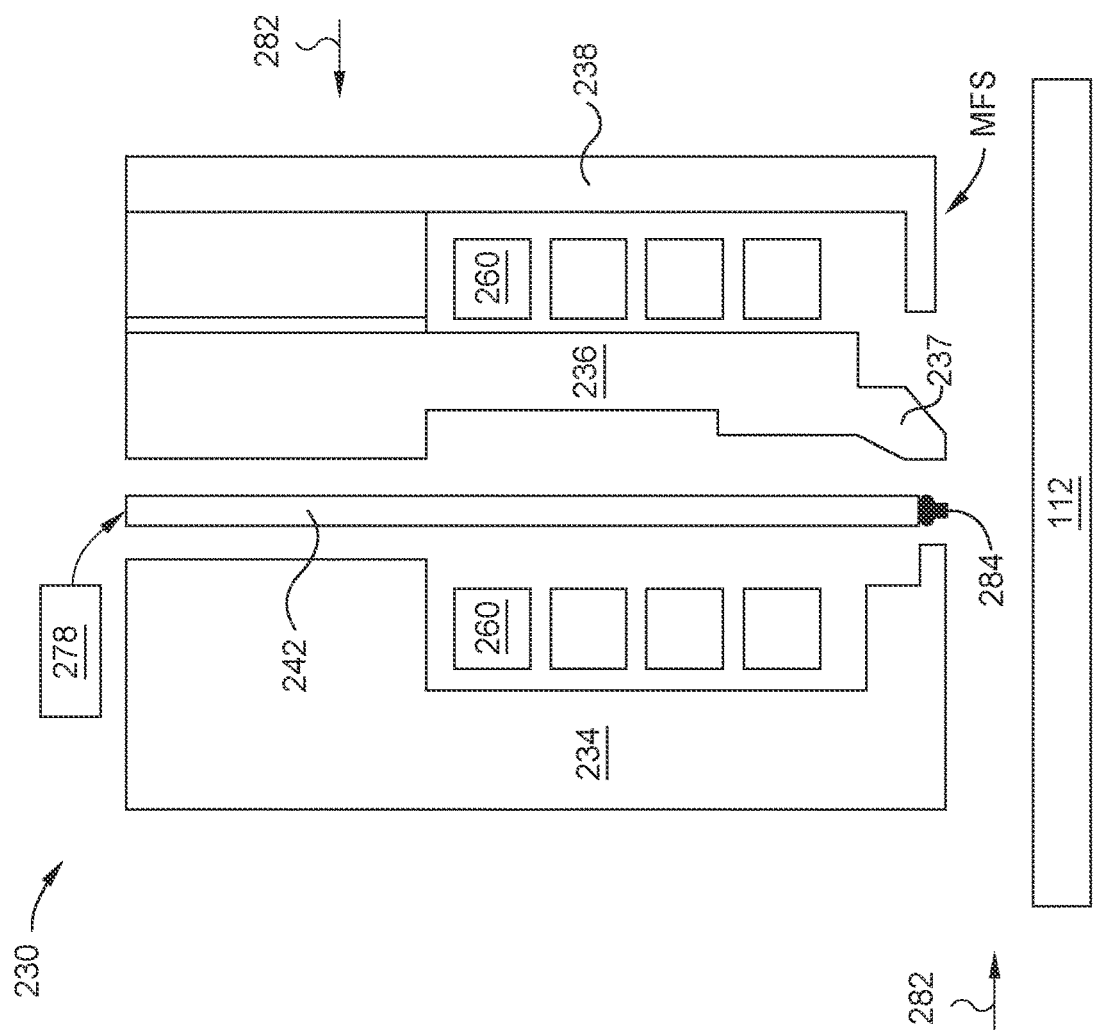
FIG. 2 is a schematic illustration of certain embodiments of a cross sectional side view of a HAMR write head facing a magnetic disk.

FIG. 2 is a schematic illustration of certain embodiments of a cross sectional side view of a HAMR write head 230 facing a magnetic disk 112. The HAMR write head 230 may correspond to part of the reading/recording head assembly 121 described in FIG. 1 or a recording head used in other magnetic media drives. The HAMR write head 230 includes a media facing surface (MFS), such as an air bearing surface (ABS) or a gas bearing surface (GBS), facing the disk 112. As shown in FIG. 2, the magnetic disk 112 and the HAMR write head 230 relatively moves in the direction indicated by the arrows 282 (need to change direction).

The HAMR write head 230 includes a main pole 236 disposed between a leading return shield 234 and a trailing return shield 238. The main pole 236 can include a main pole tip 237 at the MFS. The main pole tip 237 can include or not include a leading taper and/or a trailing taper. A coil 260 around the main pole 236 excites the main pole tip 237 to produce a writing magnetic field for affecting a magnetic medium of the rotatable magnetic disk 112. The coil 260 may be a helical structure or one or more sets of pancake structures. The leading return shield 234 and/or the trailing return shield 238 can act as the return pole for the main pole 236.

The magnetic disk 112 is positioned adjacent to or under the HAMR write head 230. A magnetic field produced by current in the coil 260 is used to control the direction of magnetization of bits in the magnetic disk 112.

The HAMR write head 230 includes a structure for heating the magnetic disk 112 proximate to where the main pole tip 237 applies the magnetic write field to the storage media. A waveguide 242 is positioned between the main pole 236 and the leading return shield 234. The waveguide 242 can includes a core layer and a cladding layer surrounding the core layer. The waveguide 242 conducts light from a light source 278 of electromagnetic radiation, which may be, for example, ultraviolet, infrared, or visible light. The light source 278 may be, for example, an edge emitting laser diode (EELD) or a vertical cavity surface emitting laser (VCSEL) device, a laser diode, or other suitable laser light source for directing a light beam toward the waveguide 242. Various techniques that are known for coupling the light source 278 into the waveguide 242 may be used. For example, the light source 278 may work in combination with an optical fiber and external optics for directing a light beam to the waveguide 242. Alternatively, the light source 278 may be mounted on the waveguide 242 and the light beam may be directly coupled into the waveguide 242 without the need for external optical configurations. Once the light beam is coupled into the waveguide 242, the light propagates through the waveguide and heats a portion of the media, as the media moves relative to the HAMR write head 230 as shown by arrows 282.

The HAMR write head 230 can include a near-field transducer (NFT) 284 to concentrate the heat in the vicinity of the end of the waveguide 242. The NFT 284 is positioned in or adjacent to the waveguide 242 near or at the MFS. Light from the waveguide 242 is absorbed by the NFT 284 and excites surface plasmons which travel along the outside of the NFT 284 towards the MFS concentrating electric charge at the tip of the NFT 284 which in turn capacitively couples to the magnetic disk and heats a precise area of the magnetic disk 112 by Joule heating. One possible NFT 284 for the HAMR write head is a lollipop design with a disk portion and a peg extending between the disk and the MFS. The NFT 284 can be placed in close proximity to the main pole 236. The NFT 284 is relatively thermally isolated and absorbs a significant portion of the laser power while it is in resonance.

Figure 3A:
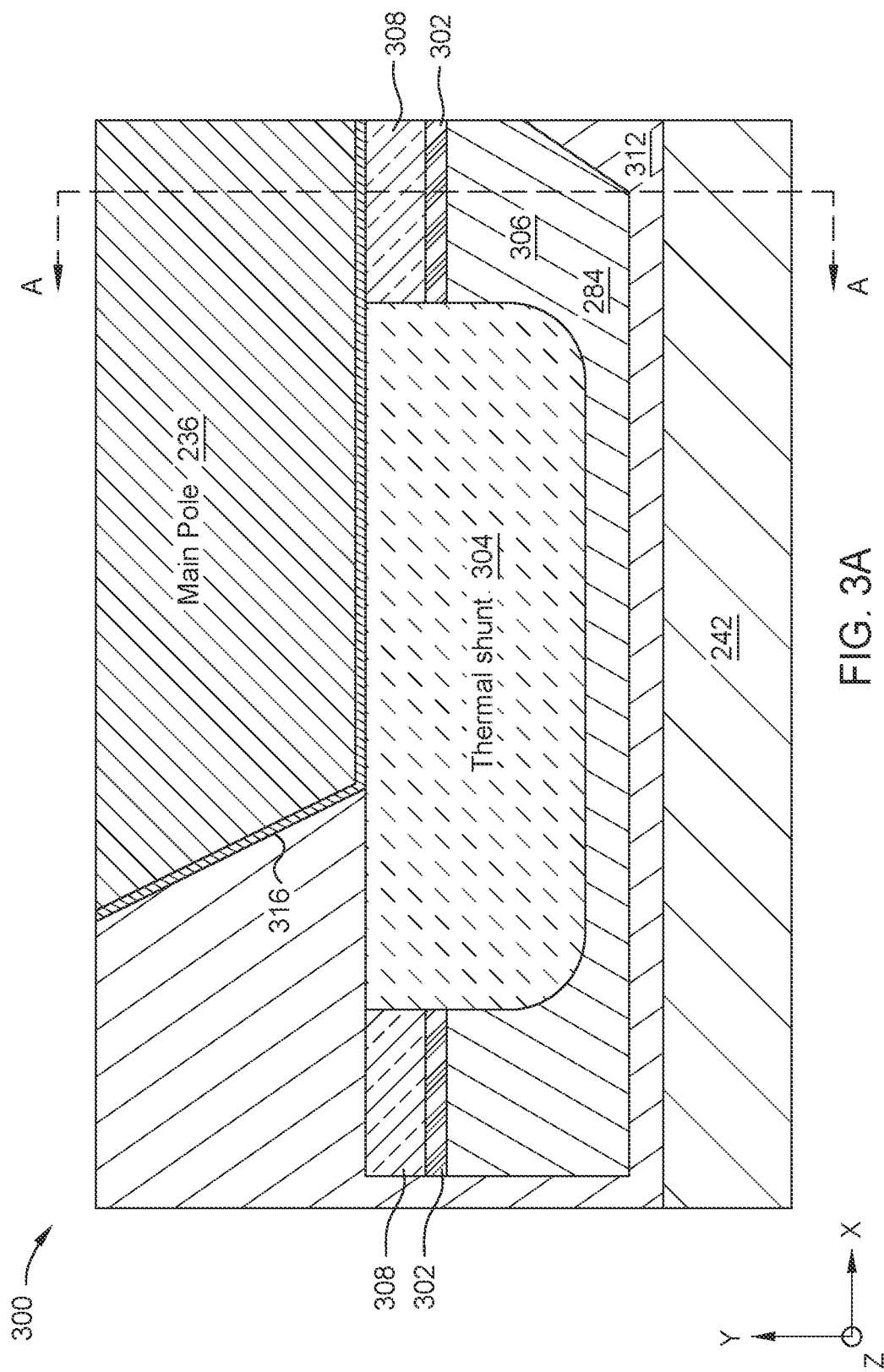
FIG. 3A illustrates a cross-sectional view of a HAMR write head, according to one embodiment.
Figure 3B:
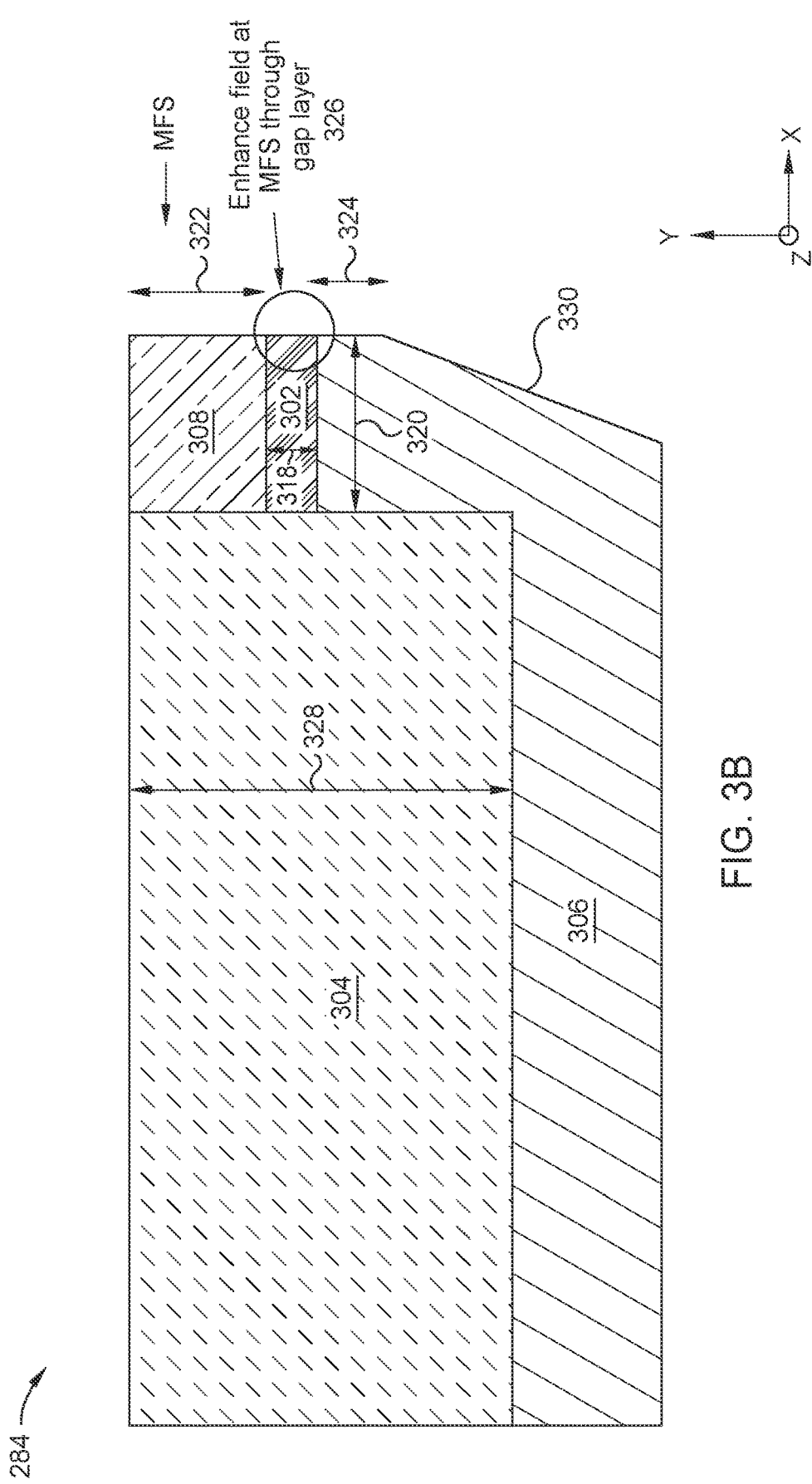
FIG. 3B illustrates a cross-sectional view of a portion of the NFT of the HAMR write head of FIG. 3A, according to one embodiment.
Figure 3C:
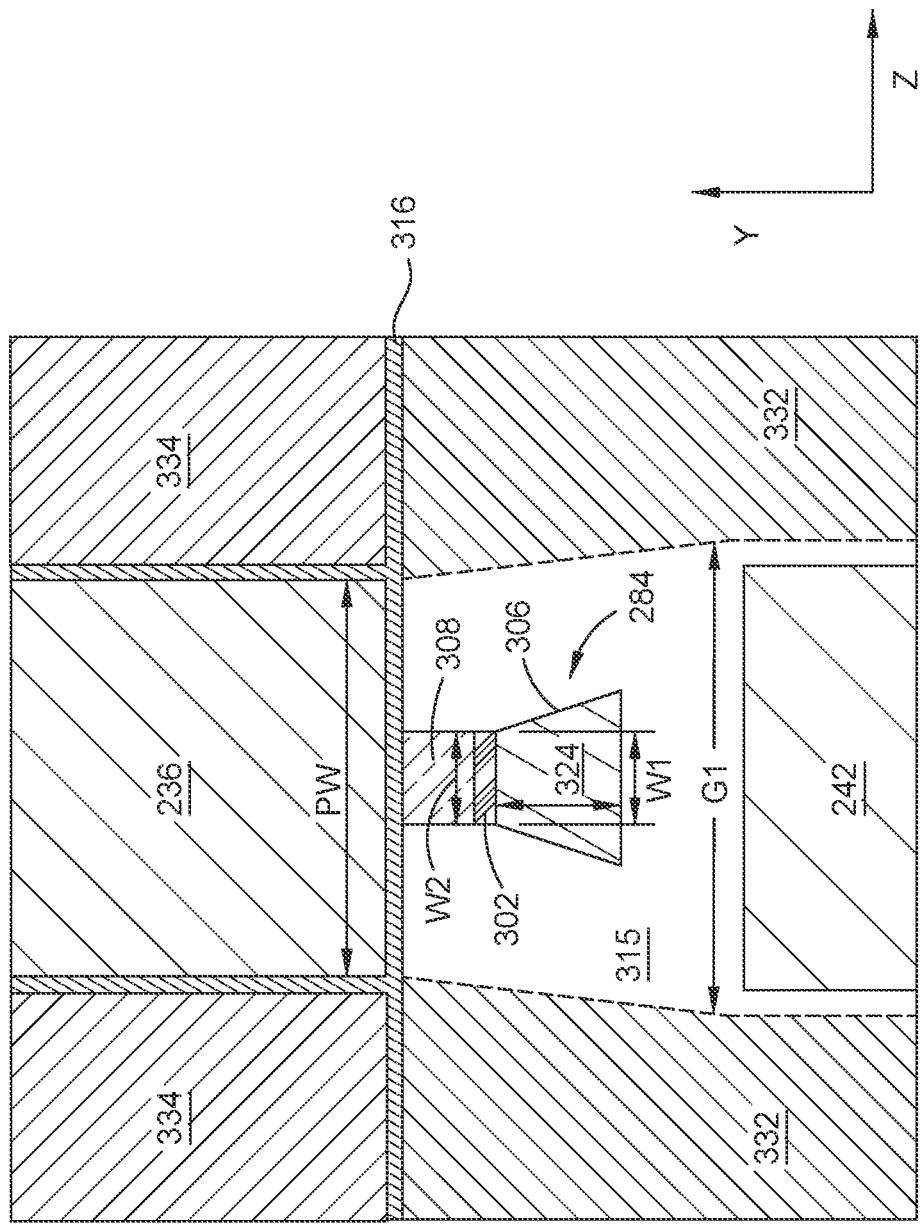
FIG. 3C illustrates a MFS view of the HAMR write head of FIGS. 3A-3B, according to one embodiment.

FIG. 3A illustrates a cross-sectional view of a HAMR write head 300, according to one embodiment. FIG. 3B illustrates a cross-sectional view of a portion of the NFT 284 of the HAMR write head 300 of FIG. 3A, according to one embodiment. FIG. 3C illustrates an MFS view of the HAMR write head 300, according to one embodiment. The HAMR write head 300 may be the HAMR write head 230 of FIG. 2, and HAMR write head 300 be, or be a part of, the magnetic media drive 100 of FIG. 1.

The HAMR write head 300 comprises the main pole 236, the waveguide 242, and the NFT 284 disposed therebetween. In the HAMR write head 300, a thermal shunt 304 is disposed on the NFT 284 recessed from the MFS. A diffusion barrier 316 is disposed between and in contact with the main pole 236 and the thermal shunt 304. The diffusion barrier 316 extends to the MFS. A first insulating layer 312 and/or cladding material 315 is disposed between the NFT 284 and the waveguide 242. The NFT 284 may be formed on the waveguide 242 without the first insulating layer 312.

The first insulating layer 312 and the cladding material 315 (shown in FIG. 3C) may each individually comprise one or more of $SiO_2$, $Al_2O_3$, silicon oxynitride (SiOxNy); where x and y are each a numeral greater than or equal to 1), aluminum silicon oxide ($Al_2O_3$—$SiO_2$), $MgF_2$, MgO, $Ta_2O_5$, $TiO_2$, SiN, and Ge doped $SiO_2$, for example. The diffusion barrier 316 may comprise one or more of Ru, Rh, Ti, W, Mo, and Pt. The thermal shunt 304 may comprise one or more of Au, Ag, Cu, Al, Rh, Ir, Ru, Cr, Pt, Ti, Fe, Co, Ni, Pd, Be, Mo, W, ZrN, TiN, HfN, and NbN. The thermal shunt 304 has a thickness or width 328 in the y-direction of about 50 nm to about 200 nm.

As shown in FIGS. 3A and 3B, the NFT 284 comprises a first metal layer 306 disposed in contact with the first insulating layer 312 adjacent to the waveguide 242, a dielectric gap layer 302 disposed on the first metal layer 306, and a second metal layer 308 disposed on the dielectric gap layer 302 and in contact with the second insulating layer 314. Each of the first metal layer 306, the dielectric gap layer 302, and the second metal layer 308 contacts the thermal shunt 304. As such, the first and second metal layers 306, 308 are connected through the thermal shunt 304, increasing the field intensity during write operations. In some embodiments, only the first metal layer 306 and the second metal layer 308 contact the thermal shunt 304.

As shown in the MFS view of FIG. 3C, the first metal layer 306 has a trapezoidal shape. The smaller portion of the trapezoidal shaped first metal layer 306 disposed adjacent to the dielectric gap layer 302 has a first width W1 of about 1 nm to about 40 nm, which determines the track width. The second metal layer 308 has a square or rectangular shape, and has a second width W2 which is substantially equal to the first width W1 of the first metal layer 306. However, the second width W2 may be slightly smaller or slightly larger than the first width W1.

As further shown in FIG. 3C, cladding material 315 is disposed around the NFT 284 at the MFS. Side shields 332 are disposed around the cladding material 315 and the NFT 284. The side shields 332 are formed at the side of the NFT 284 to reduce background light generated around the NFT 284. By reducing the background light, the thermal gradient in the recording layer of the media is increased and the areal recording density can be increased. For example, the side shields 332 may comprise one or more materials selected from the group consisting of: Au, Ag, Cu, Al, Rh, Ir, Ru, Cr, Pt, Ti, Fe, Co, Ni, Pd, Be, Mo, W, ZrN, TiN, HfN, and NbN. The gap G1 between the side shields 332 (i.e., a width of the cladding material 315) is about 100 nm to about 300 nm. A heat sink 334 is disposed on either side of the main pole 236. The heat sink 334 may comprise Cu or Au, for example. The main pole 236 has a pole width PW of about 50 nm to about 200 nm.

The first and second metal layers 306, 308 may each individually comprise one or more materials selected from the group consisting of: Au, Ag, Cu, Al, Rh, Ir, Ru, Cr, Pt, Ti, Fe, Co, Ni, Pd, Be, Mo, W, ZrN, TiN, HfN, and NbN. In some embodiments, the first and second metal layers 306, 308 comprise the same material. In other embodiments, the first and second metal layers 306, 308 comprise different materials. A portion of the first metal layer 306 has a thickness or width 324 in the y-direction of about 1 nm to about 60 nm from the dielectric gap layer 302 to a leading edge taper 330 or bevel of the first metal layer 306. The first metal layer 306 has a total thickness in the y-direction of about 50 nm to about 150 nm. The second metal layer 308 has a thickness or width 322 in the y-direction of about 20 nm to about 100 nm from the dielectric gap layer 302 to the diffusion barrier layer 316. The first metal layer 306, the dielectric gap layer 302, and the second metal layer 308 each have a length 320 in the x-direction of about 30 nm to about 100 nm from the MFS to the thermal shunt 304. The dielectric gap layer 302 has a thickness or width 318 in the y-direction of about 5 nm to about 30 nm. The dielectric gap layer 302 enhances the field at the MFS during write operations (shown by circle 326).

The dielectric gap layer 302 may comprise one or more of $SiO_2$, $Al_2O_3$, silicon oxynitride (SiOxNy); where x and y are each a numeral greater than or equal to 1), aluminum silicon oxide ($Al_2O_3$—$SiO_2$), $MgF_2$, MgO, $Ta_2O_5$, $TiO_2$, SiN, and Ge doped $SiO_2$. Using a lower refractive index material for the dielectric gap layer 302, such as $MgF_2$, can improve the optical efficiency, reduce the laser power, and reduce the temperature of the NFT 284. Using a higher refractive index material for the dielectric gap layer 302, such as $Ta_2O_5$ and/or $TiO_2$, can reduce the reflectance of the NFT 284, and therefore reduce mode hop of the laser. Using a material with a higher thermal conductivity for the dielectric gap layer 302, such as AlN, the temperature of the NFT 284 is reduced. Using a material with a higher robustness for the dielectric gap layer 302, such as $Ta_2O_5$, can improve the overall lifetime of the NFT 284.

Figure 4A:
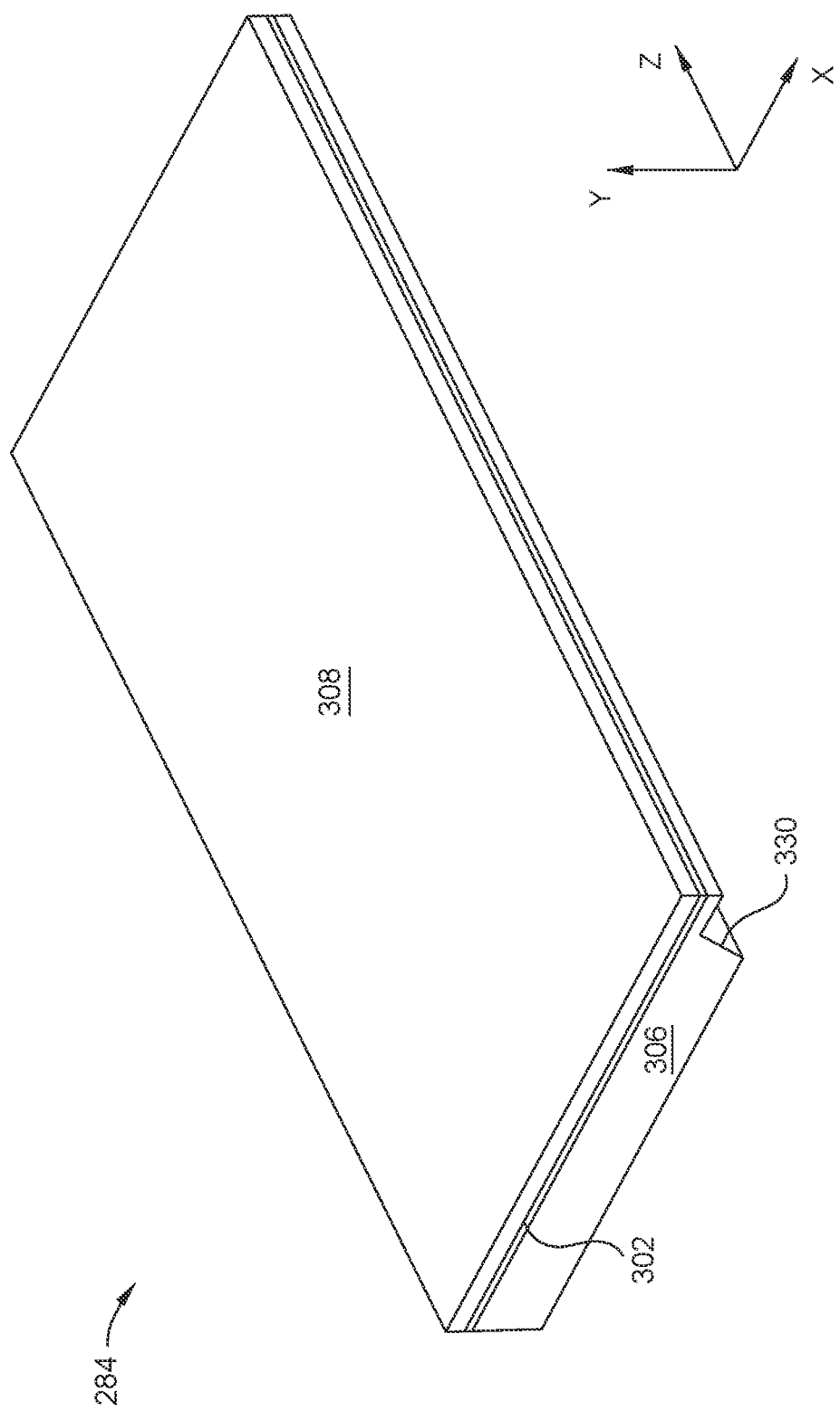
FIGS. 4A-4D illustrate various perspective views of forming the NFT of FIGS. 3A-3B, according to embodiments herein.

FIGS. 4A-4D illustrate various perspective views of forming the NFT 284 of FIGS. 3A-3C, according to embodiments herein. FIG. 4A illustrates the first metal layer 306 being deposited, the dielectric gap layer 302 being deposited on the first metal layer 306, and the second metal layer 308 being deposited on the dielectric gap layer 302. Upon depositing the layers 302, 306, 308, a leading edge taper 330 or bevel is formed in the first metal layer 306 where the MFS will be later be.

Figure 4B:
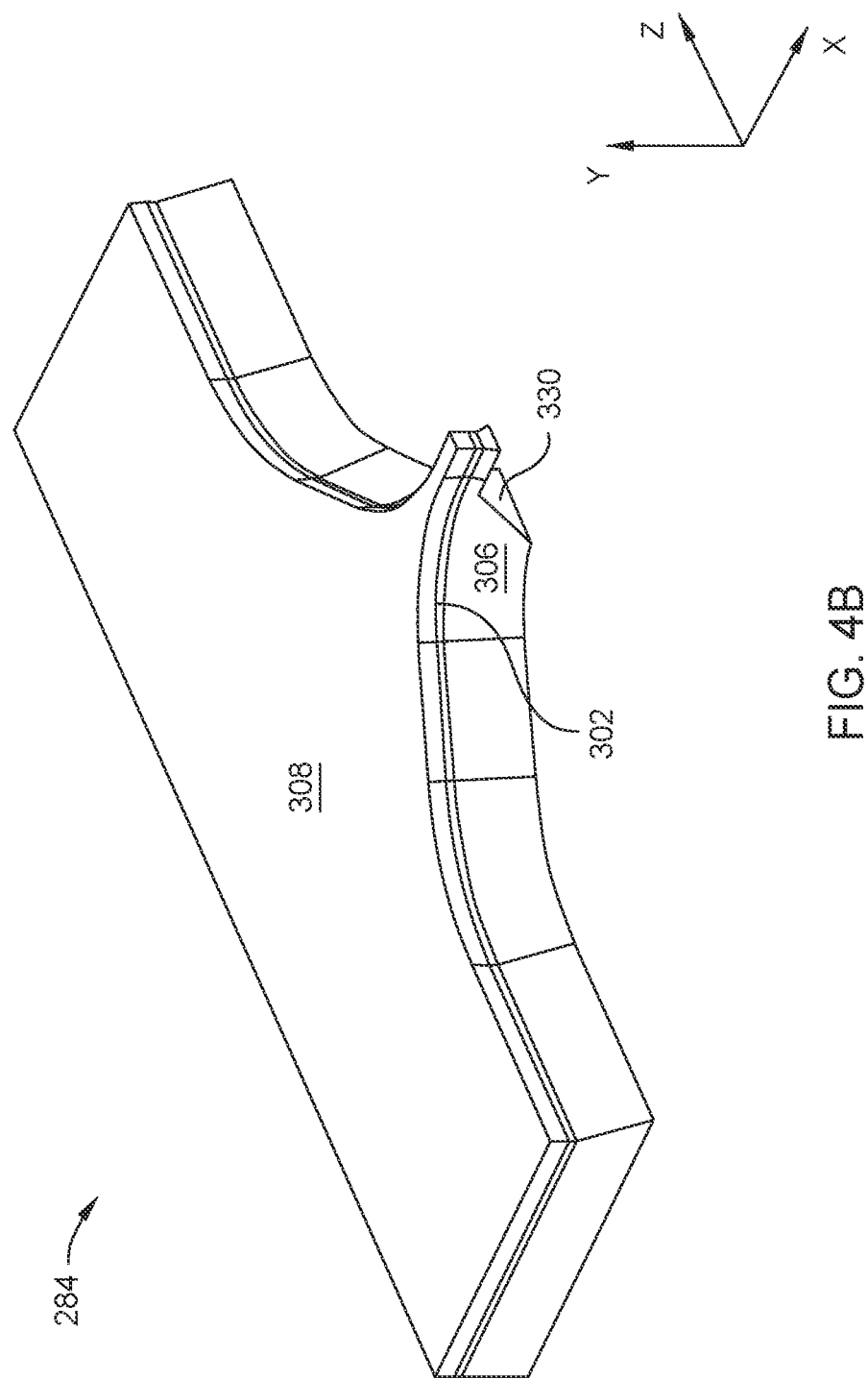

In FIG. 4B, first portions of the first metal layer 306, the dielectric gap layer 302, and the second metal layer 308 are etched or removed to shape the NFT 284. The first portions of the first metal layer 306, the dielectric gap layer 302, and the second metal layer 308 removed result in the remaining portions of the layers 302, 306, 308 of the NFT 284 being flared.

Figure 4C:
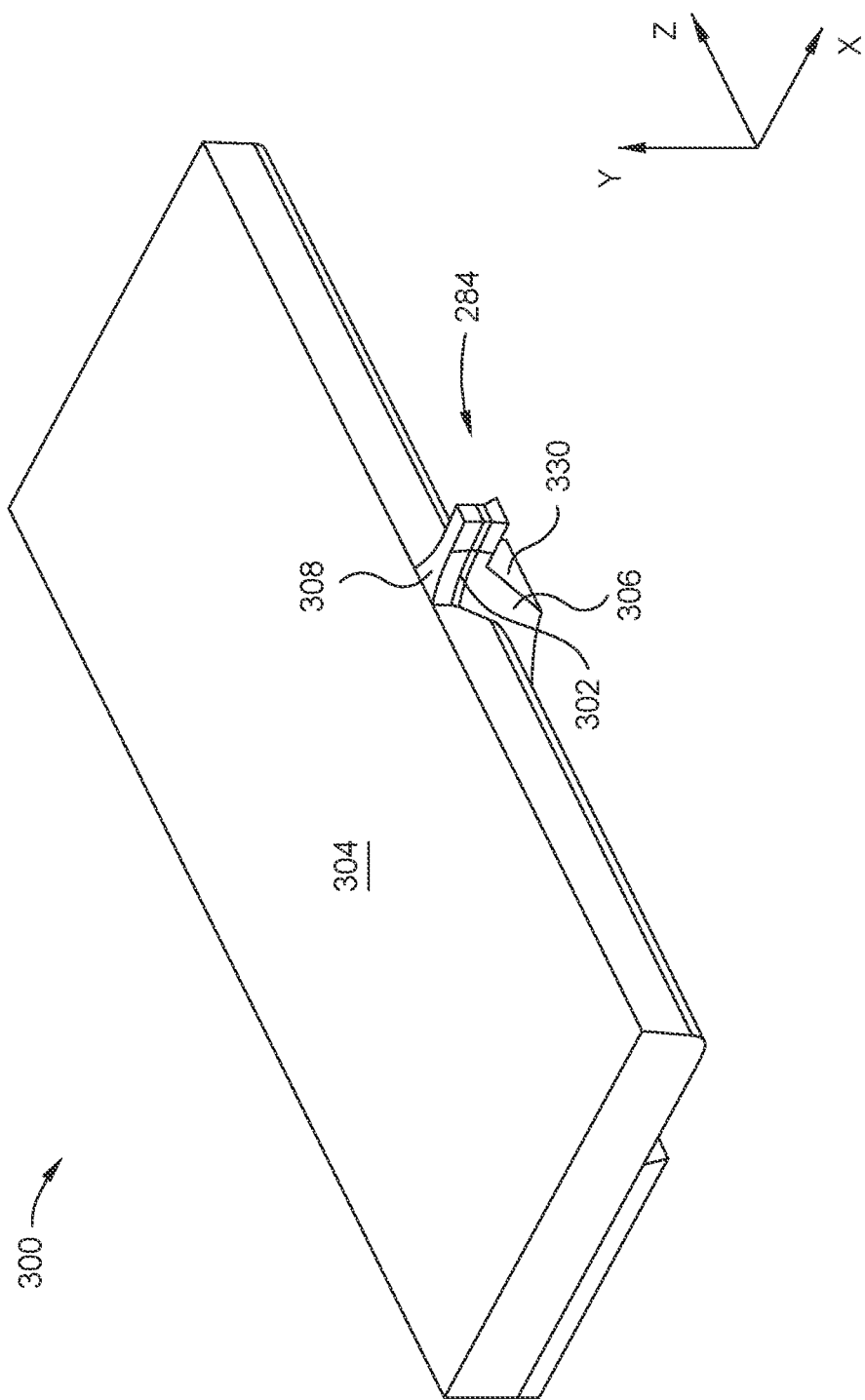

In FIG. 4C, second portions of the first metal layer 306, the dielectric gap layer 302, and the second metal layer 308 are etched or removed in the x-direction (i.e., depth-wise) in order to deposit the thermal shunt 304. Upon removing the second portions of the first metal layer 306, the dielectric gap layer 302, and the second metal layer 308, the thermal shunt 304 is deposited such that thermal shunt 304 is recessed from the MFS and in contact with each of the first metal layer 306, the dielectric gap layer 302, and the second metal layer 308. The second portions of the second metal layer 308 and the dielectric gap layer 302 are removed entirely (depth-wise) such that the thermal shunt 304 is disposed on a portion of the first metal layer, like shown in FIG. 3B. The thermal shunt 304 is rectangular in shape, and thus, has a different shape than the flared first metal layer 306, the flared dielectric gap layer 302, and the flared second metal layer 308.

Figure 4D:
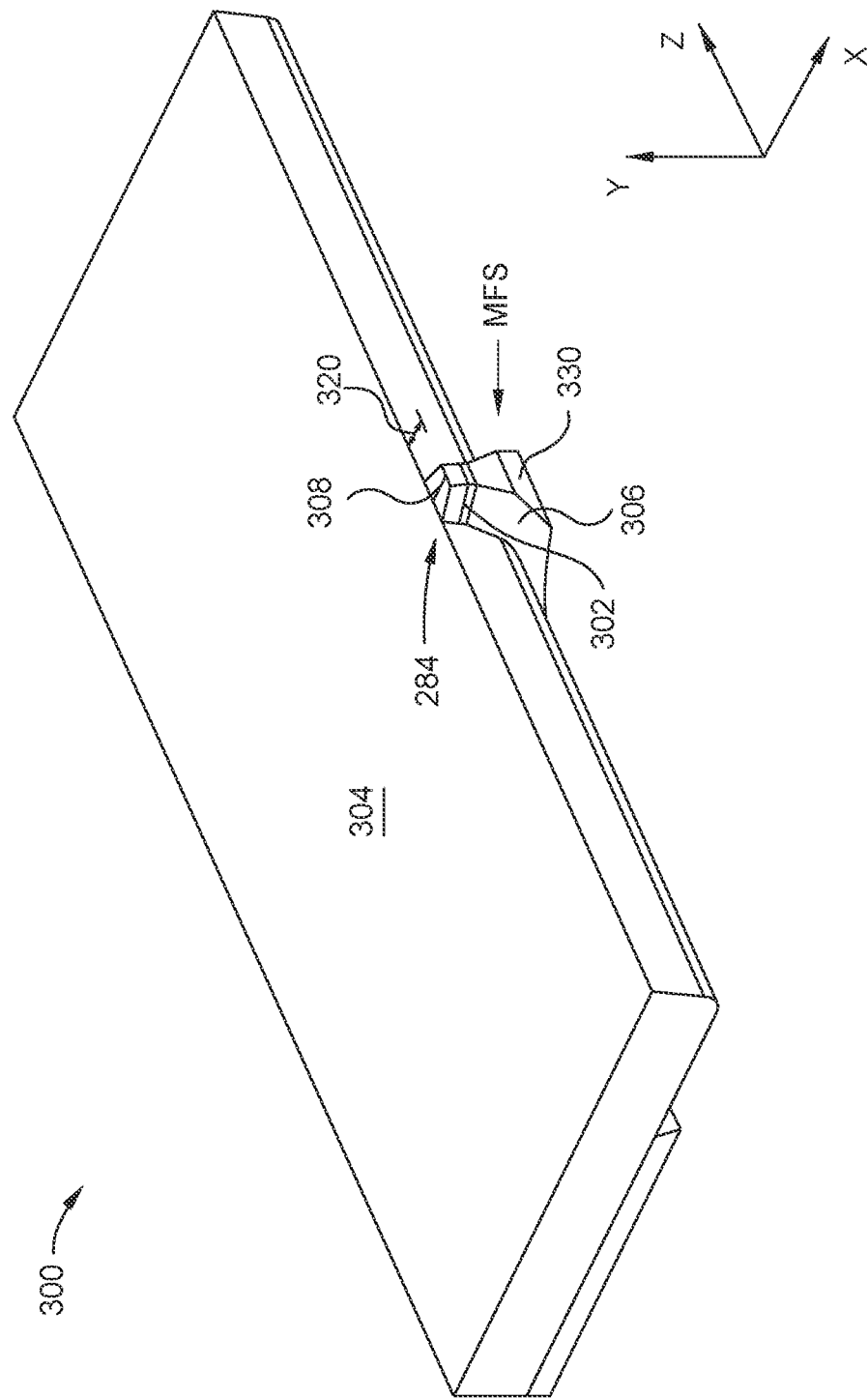

In FIG. 4D, third portions of the first metal layer 306, the dielectric gap layer 302, and the second metal layer 308 are removed to define the MFS of the NFT 284. The third portions removed are the front-most portions, and removal of the third portions further defines the length 320 of the first metal layer 306, the dielectric gap layer 302, and the second metal layer 308 in the x-direction.

FIGS. 5A-5E illustrate cross-sectional views of the HAMR write head 300 of FIGS. 3A-3C through the line A-A in FIG. 3A, according to various embodiments. Aspects of the embodiments of FIGS. 5A-5E may be used in combination with one another.

Figure 5A:
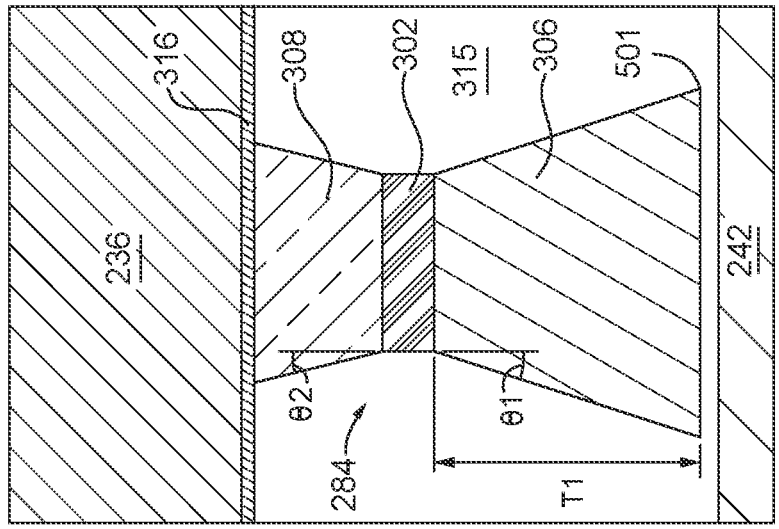
FIGS. 5A-5E illustrate cross-sectional views of the HAMR write head of FIGS. 3A-3C through the line A-A in FIG. 3A head, according to various embodiments.

In the embodiment of FIG. 5A, the first metal layer 306 has a thickness T1 in the y-direction, and has a sidewall angle θ1 of about 0 degrees to about 50 degrees. The first metal layer 306 has a trapezoidal shape, where the corners 501 of the first metal layer 306 disposed adjacent to the waveguide 242 are sharply pointed. To achieve high thermal gradient in recording layer, it is preferred to make the side wall angle θ1 of the first metal layer 306 on the smaller end of the range. However, if the angle θ1 is too small, the optical efficiency of NFT 284 decreases and the temperature of the NFT 284 increases. Thus, it is preferable to make the angle θ1 between about 10 degrees to about 30 degrees for reliability.

The second metal layer 308 has a second side wall angle θ2 as shown in FIG. 5A, which may be larger than 0 degrees or negative. By making the angle θ larger than 0 degrees, for example, about 5 degrees to about 20 degrees, the optical field is more confined in the gap 302, and a smaller optical spot can be achieved.

Figure 5B:
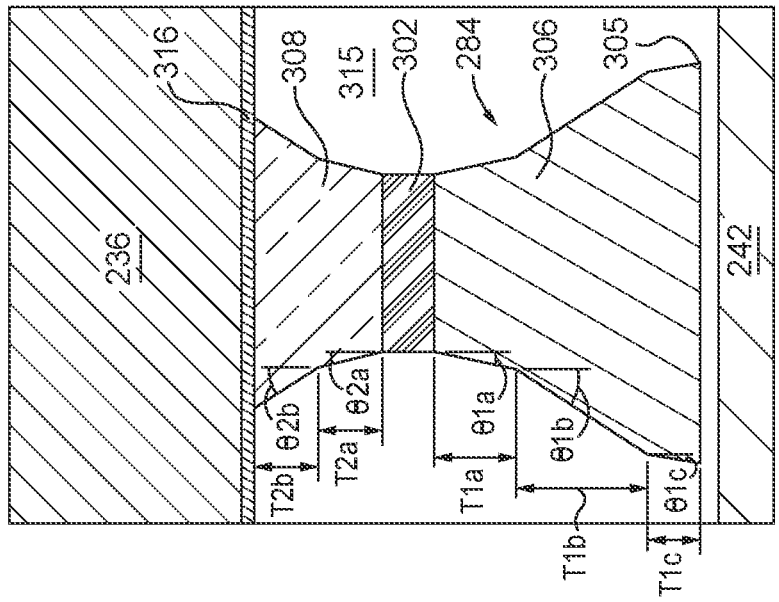

In the embodiment of FIG. 5B, the sidewalls of the first and second metal layers 306, 308 are curved such that the first metal layer 306, the dielectric gap layer 302, and the second metal layer 308 collectively have a rough hourglass-like shape where the dielectric gap layer 302 has the narrowest width in the z-direction. However, the first metal layer 306 still has a sharp corner 305 at the base, which may cause background light. By reducing the wall angle at the base (θ1c), the background light is reduced and the thermal gradient in recording layer can be increased.

For example, in FIG. 5B, the first metal layer 306 can have the following profile: a portion of the first metal layer 306 disposed adjacent to the dielectric gap layer 302 has an angle θ1a equal to about 0 degrees to about 10 degrees and a thickness T1a in the y-direction equal to about 10 nm to about 30 nm; a middle portion of the first metal layer 306 disposed between the corner 305 and the dielectric gap layer 302 has an angle θ1b of about 20 degrees to about 40 degrees and a thickness T1b in the y-direction of about 30 nm to about 70 nm; and a portion of the first metal layer 306 disposed near the sharp corner 305 has an angle θ1c of about 0 degrees to about 10 degrees and a thickness T1c in the y-direction of about 5 nm to about 30 nm.

The wall angle of the second metal layer 308 also may be changed in multiple steps in the embodiment of FIG. 5B. For example, the second metal layer 308 may have the following profile: a portion of the second metal layer 308 disposed adjacent to the dielectric gap layer has an angle θ2a of about 0 degrees to about 10 degrees and a thickness T2a in the y-direction of about 10 nm to about 20 nm; and a portion of the second metal layer 308 disposed adjacent to the diffusion barrier layer 316 has an angle θ1b of about 20 degrees to about 40 degrees and a thickness T2b in the y-direction of about 20 nm to about 30 nm.

Figure 5C:
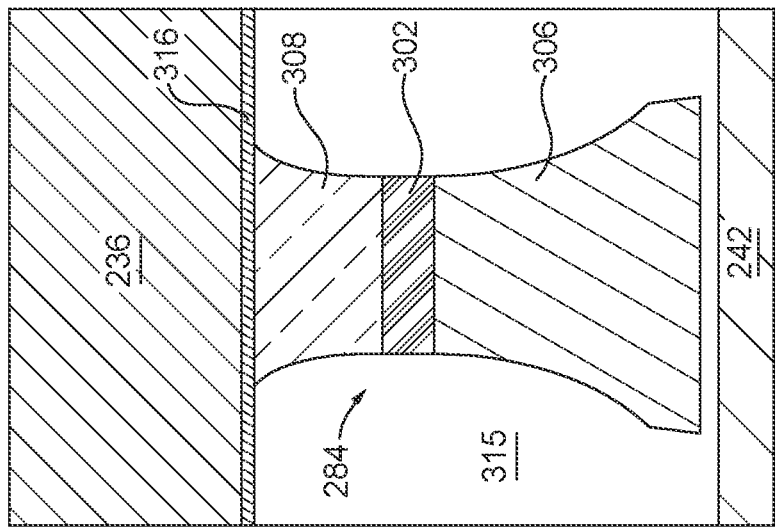

In the embodiment of FIG. 5C, the wall angle of the first metal layer 306 and/or the second metal layer 308 may be changed gradually so the NFT 284 has an overall curved profile or an hourglass-like shape.

Figure 5D:
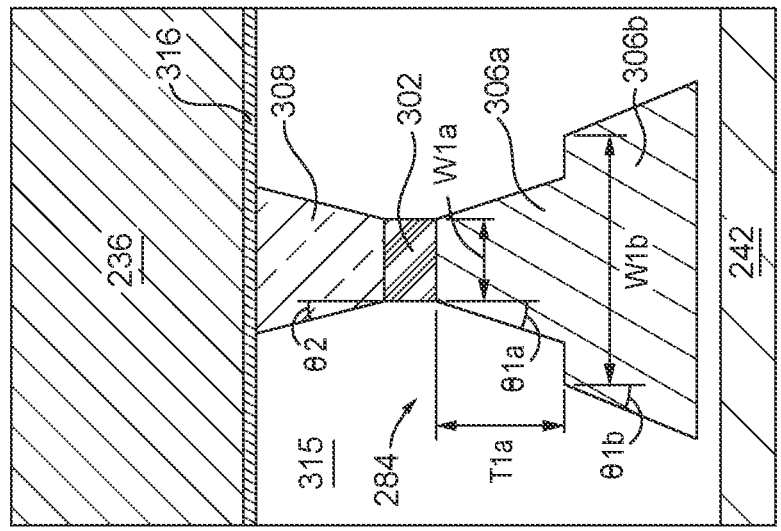

In the embodiment of FIG. 5D, the first metal layer 306 comprises a narrow top portion 306a disposed adjacent to the dielectric gap layer 302 and a wide bottom portion 306b. Each portion 306a, 306b may be fabricated separately. The first metal layer 306 may have the following profile: a first width W1a of the narrow portion 306a in the z-direction equal to about 1 nm to about 40 nm, an angle θ1a of the narrow portion 306a of about 0 degrees to about 30 degrees, and a thickness T1a of the narrow portion 306a in the y-direction of about 10 nm to about 70 nm; and a width W1b of the wide portion 306b in the z-direction of about 50 nm to about 150 nm, an angle θ1b of the wide portion 306b of about 0 degrees to about 50 degrees, and a thickness T1b of the wide portion 306b in the y-direction of about 20 nm to about 70 nm.

Figure 5E:
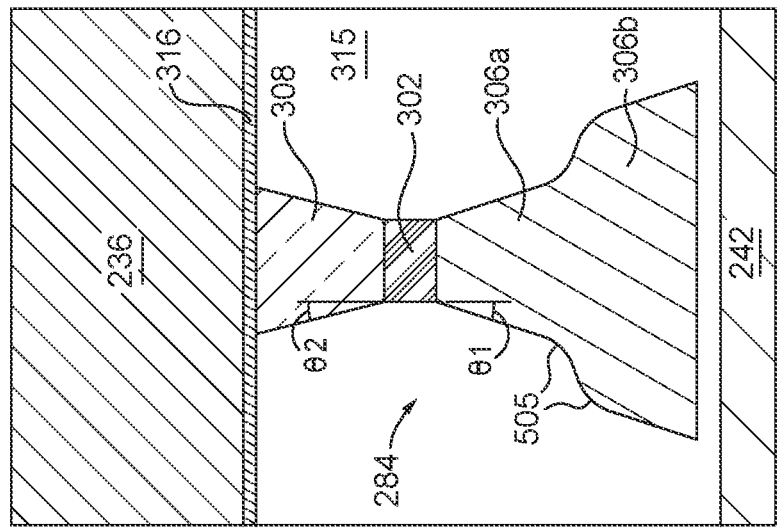

When the first metal layer 306 comprises the narrow top portion 306a and the wide bottom portion 306b, it is preferred to make the corners 505 of each portion 306a, 306b rounded to reduce scattering of light at the corners and improve the thermal gradient in recording layer as shown in FIG. 5E.

Figure 6A:
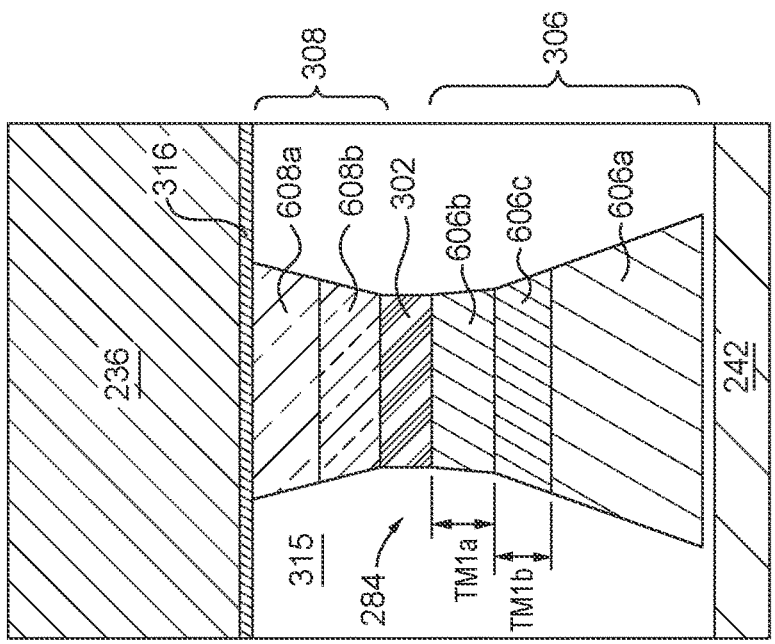
FIGS. 6A-6C illustrate cross-sectional views of the HAMR write head of FIGS. 3A-3C through the line A-A in FIG. 3A where the NFT comprises additional metal sublayers, according to various embodiments.
Figure 6B:
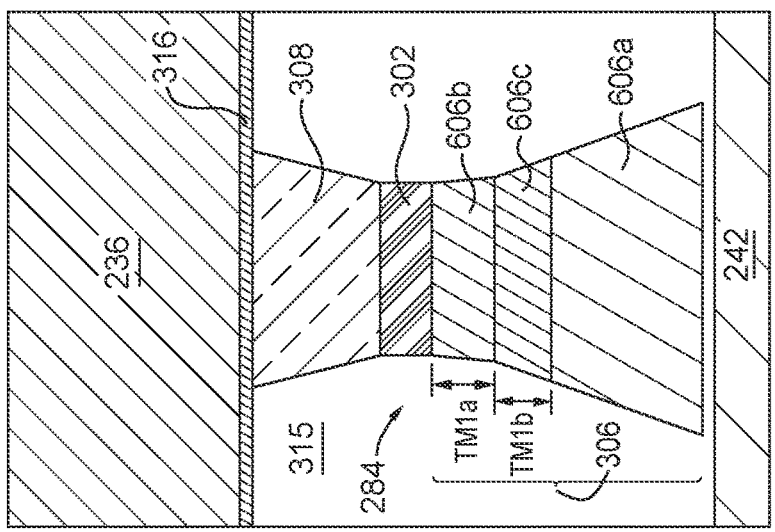
Figure 6C:
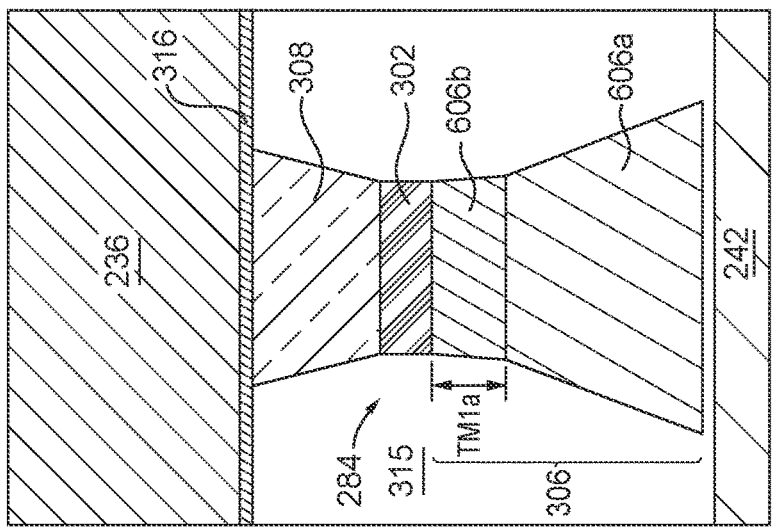

FIGS. 6A-6C illustrate cross-sectional views of the HAMR write head 300 of FIGS. 3A-3C through the line A-A in FIG. 3A where the NFT 284 comprises additional metal sublayers, according to various embodiments. Aspects of the embodiments of FIGS. 6A-6C may be used in combination with one another. Furthermore, aspects of the embodiments of FIGS. 6A-6C may be used in combination with the embodiments of FIGS. 5A-5E.

In the embodiment of FIG. 6A, the first metal layer 306 comprises a first metal sublayer 606a and a second metal sublayer 606b disposed between the first metal sublayer 606a and the dielectric gap layer 302. The first and second metal sublayers 606a, 606b may comprise different materials. The first metal sublayer 606a may comprise any material noted above in the embodiment of FIG. 3A-3C.

The second material sublayer 606b is utilized over the top of the first metal sublayer 606a to improve the robustness of the NFT 284. When a strong optical near-field is generated at the dielectric gap layer 302, the temperature of the NFT 284 is highest at the top of the first metal layer 306 (i.e., near the dielectric gap layer 302). The NFT 284 temperature decreases with the distance from the top of the first metal layer 306. By using a robust material at the top of the first metal layer 306, the reliability of the NFT 284 can be improved. For example, one or more of the following materials can be used for the material of the second metal sublayer 606b: Rh, Ir, Cu, Ag, Al, Ru, Cr, Pt, Ti, Fe, Co, Ni, Pd, Be, Mo, W, ZrN, TiN, HfN, NbN, and alloy material which consists of two or more of Au, Rh, Ir, Cu, Ag, Al, Ru, Cr, Pt, Ti, Fe, Co, Ni, Pd, Be, Mo, and W. The thickness TM1a of the second material sublayer 606b is about 5 nm to about 50 nm; however the thickness TM1a can be smaller or larger depending on the material.

The embodiment of FIG. 6B is similar to the embodiment of FIG. 6A; however, the embodiment of FIG. 6B further comprises a third metal sublayer 606c disposed between the first metal sublayer 606a and the second metal sublayer 606b. The robust material of the second metal sublayer 606b tends to have higher optical absorption, which increases the NFT 284 temperature. By using a less robust material with lower optical loss in the region away from the dielectric gap layer 302 where the third material sublayer 606c is located, the robustness can be improved without increasing the temperature too much. For example, the second metal sublayer 606b may comprise Rh with a thickness TM1a in the y-direction of about 5 nm to about 20 nm, and the third metal sublayer 606c may comprise AuRh with a thickness TM1b in the y-direction of about 10 nm to about 50 nm. However, any other material combinations can be used and the optimum thickness depends on the material. It is further noted that more than two different material sublayers, such as 3 or 4 material sublayers may be included in the first metal layer 306.

The embodiment of FIG. 6C is similar to the embodiment of FIG. 6B; however, in the embodiment of FIG. 6C, the second metal layer 308 also comprises multiple sublayers 608a, 608b comprising different materials. As shown, the second metal layer 308 comprises a first metal sublayer 608a and a second metal sublayer 608b disposed between the first metal sublayer 608a and the dielectric gap layer 302. The first metal sublayer 608a may comprise any material noted above in the embodiment of FIG. 3A-3C. The second metal sublayer 608b may comprise one or more materials selected from the group consisting of Rh, Ir, Cu, Ag, Al, Ru, Cr, Pt, Ti, Fe, Co, Ni, Pd, Be, Mo, W, ZrN, TiN, HAN, NbN, and alloy material which consists of two or more of Au, Rh, Ir, Cu, Ag, Al, Ru, Cr, Pt, Ti, Fe, Co, Ni, Pd, Be, Mo, and W, with a thickness in the y-direction of about 5 nm to about 20 nm.

Figure 7A:
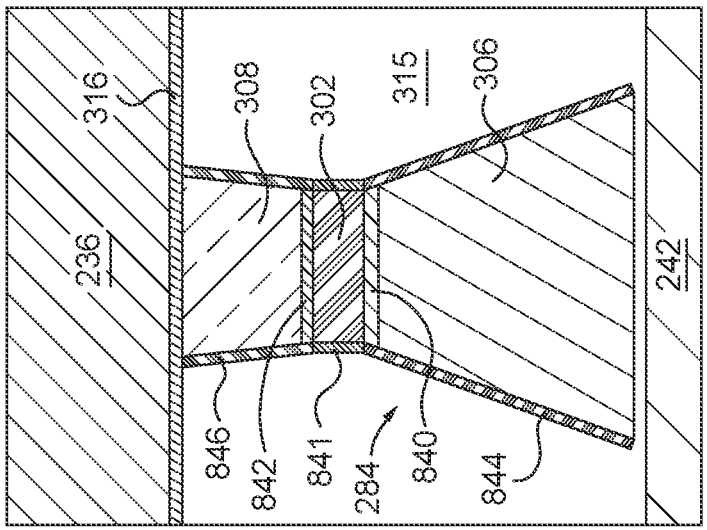
FIGS. 7A-7C illustrate cross-sectional views of the HAMR write head of FIGS. 3A-3C through the line A-A in FIG. 3A further comprising one or more adhesion layers, according to various embodiments.
Figure 7B:
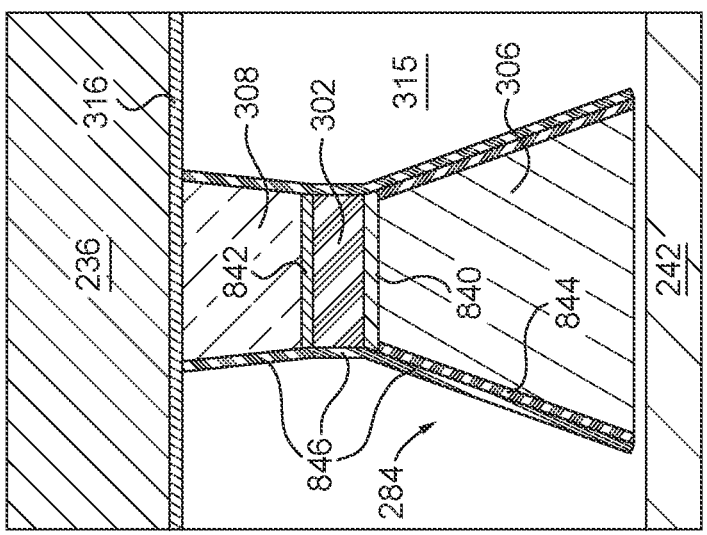
Figure 7C:
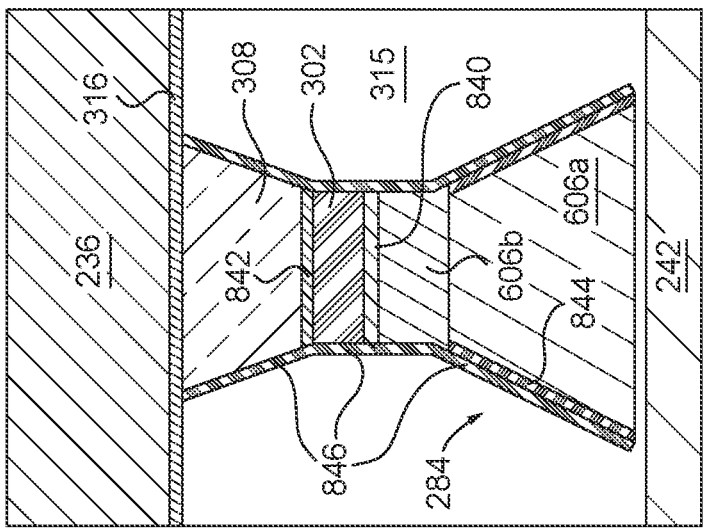

FIGS. 7A-7C illustrate cross-sectional views of the HAMR write head 300 of FIGS. 3A-3C through the line A-A in FIG. 3A further comprising one or more adhesion layers, according to various embodiments. Aspects of the embodiments of FIGS. 7A-7C may be used in combination with one another. Furthermore, aspects of the embodiments of FIGS. 7A-7C may be used in combination with the embodiments of FIGS. 5A-5E and/or FIGS. 6A-6C.

In some instances, like shown in FIGS. 7A-7C, it is beneficial to deposit first and second adhesion layers 840, 842 between the first and second metal layers 306, 308 and the dielectric gap layer 302, as well as depositing third and fourth adhesion layers 844, 846 between the first and second metal layers 306, 308 and the cladding layer 315 to increase the adhesion strength between the NFT 284, the dielectric gap layer 302, and the cladding layer 315 around the NFT 284. If the adhesion strength is weak, the NFT 284 may become deformed when it is heated during recording. Each adhesion layer 840-846 may individually comprise one or more materials selected from the group consisting of: Rh, Cr, Ti, Ta, Zr, Ir, W, Al, Ru, Pd, Pt, $Rh_2O_3$, $Cr_2O_3$, $TiO_2$, $Ta_2O_5$, $ZrO_2$, $IrO_2$, $HfO_2$, $Y_2O_3$, In-doped tin oxide (ITO), Al-doped ZnO (AZO), and Ga-doped ZnO (GZO). Each adhesion layer 840-846 may individually comprise multiple layers of different materials. The thickness of each individual adhesion layer 840-846 in the y-direction (for 840 and 842) or in the z-direction (for 844 and 846) is between about 2 Å to about 5 nm depending on the material of the adhesion layers 840-846.

In the embodiment of FIG. 7A, an additional adhesion layer 841 is shown deposited on the side of the dielectric layer 302 adjacent to the cladding layer 315. However, if the adhesion layer 841 is not transparent, it is preferred not to include the adhesion layer 841 on the side of dielectric gap layer 302, because the optical near-field generated in the dielectric gap layer 302 is absorbed by the adhesion layer 284, causing the NFT 284 temperature to increase.

In the embodiment of FIG. 7B, the third adhesion layer 844 is first deposited on the side of the first metal layer 306 using angled deposition, and then the fourth adhesion layer 846 may be deposited on the second metal layer 308, the dielectric gap layer 302, and the third adhesion layer 844. The third adhesion layer 844 may be a metallic adhesion layer comprising one or more materials selected from the group consisting of: Rh, Cr, Ti, Ta, Zr, Ir, W, Al, Ru, Pd, and Pt, and the fourth adhesion layer 846 may comprise one or more dielectric materials selected from the group consisting of: $Cr_2O_3$, $TiO_2$, $Ta_2O_5$, $ZrO_2$, $IrO_2$, $HfO_2$, $Y_2O_3$, In-doped tin oxide (ITO), Al-doped ZnO (AZO), and Ga-doped ZnO (GZO).

Because the first metal layer 306 is heated more than the second metal layer 308 during recording, the first metal layer 306 has a higher temperature. Therefore, the adhesion layers 840, 844 disposed on the first metal layer 306 require stronger adhesion strength than the adhesion layers 842, 846 disposed on the second metal layer 308. The metallic adhesion layer 844 typically has a higher adhesion strength and a higher optical absorption, which increases the NFT 284 temperature. By depositing the metallic adhesion layer 844 only on the first metal layer 306, and depositing the dielectric adhesion layer 846 on other locations, the temperature rise of the NFT 284 can be reduced (e.g., the light absorption on the side of the dielectric layer 302 is reduced).

The embodiment of FIG. 7C is similar to the embodiment of FIG. 7B; however, the first metal layer 306 of the embodiment of FIG. 7C further comprises the first metal sublayer 606a and the second metal sublayer 606b. When the first metal layer 306 includes the second metal sublayer 606b having a high robustness, the third adhesion layer 844 may be deposited only on the first metal sublayer 606a.

FIG. 8A illustrates a cross-sectional view of a HAMR write head 800, according to another embodiment. FIG. 8B illustrates a cross-sectional view of a portion of the NFT 284 of the HAMR write head 800 of FIG. 8A along the A-A line, according to one embodiment. The HAMR write head 800 may be the HAMR write head 230 of FIG. 2, and HAMR write head 800 be, or be a part of, the magnetic media drive 100 of FIG. 1. Aspects of the embodiments of FIGS. 8A-8B may be used in combination with the embodiments of FIGS. 5A-5E, FIGS. 6A-6C, and/or FIGS. 7A-7C.

The HAMR write head 800 is similar to the HAMR write head 300 of FIGS. 3A-3C; however, the HAMR write head 800 comprises a third metal layer 850 disposed between the second metal layer 308 and the diffusion barrier layer 316. The third metal layer 850 extends over the thermal shunt 304 in the x-direction. By adding third metal layer 850, the temperature rise at the second metal layer 306 can be reduced. The third metal layer 850 may comprise one or more materials selected from the group consisting of: Au, Ag, Cu, Al, Rh, Ir, Ru, Cr, Pt, Ti, Fe, Co, Ni, Pd, Be, Mo, W, ZrN, TiN, HfN, and NbN. As shown in FIG. 8B, the thickness T2 of the second metal layer 308 is about 5 nm to about 50 nm, and the thickness T3 of the third metal layer 850 is about 5 nm to about 50 nm. As further shown in FIG. 8B, the width of the third metal layer 850 in the z-direction is greater than the widths of the first metal layer 306, the second metal layer 308, and the dialectic gap layer 302.

Figure 9A:
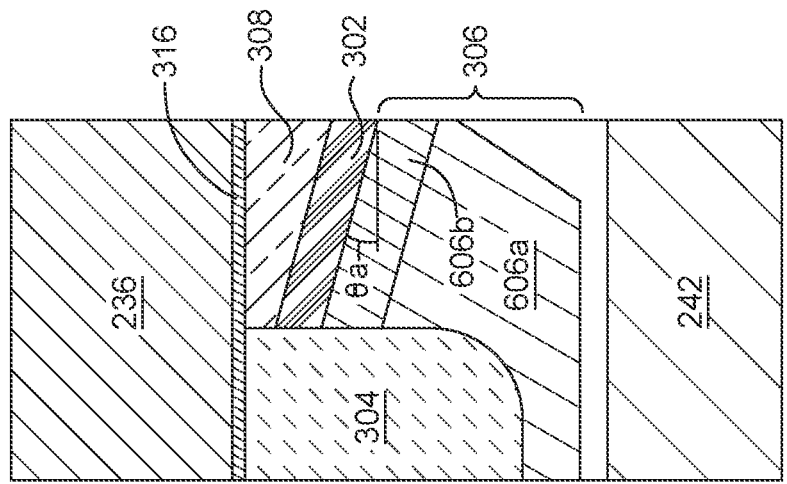
FIGS. 9A-9C illustrate cross-sectional views of the HAMR write head of FIGS. 3A-3C through the line A-A in FIG. 3A having tilted dielectric gap layers, according to various embodiments.
Figure 9B:
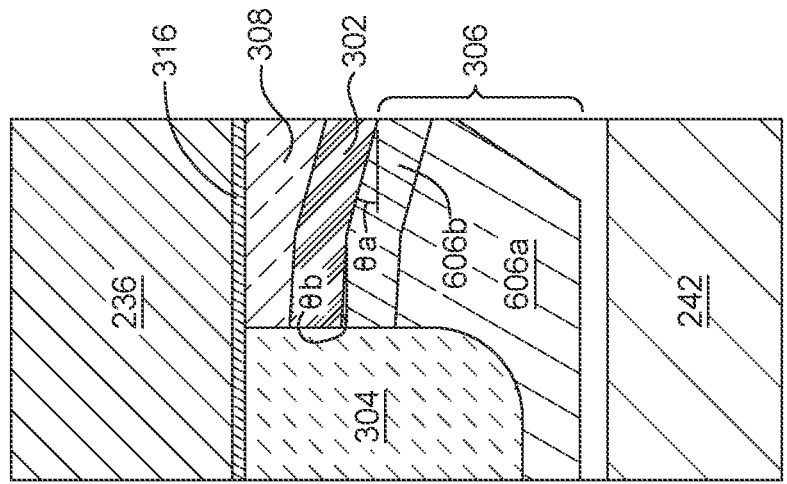
Figure 9C:
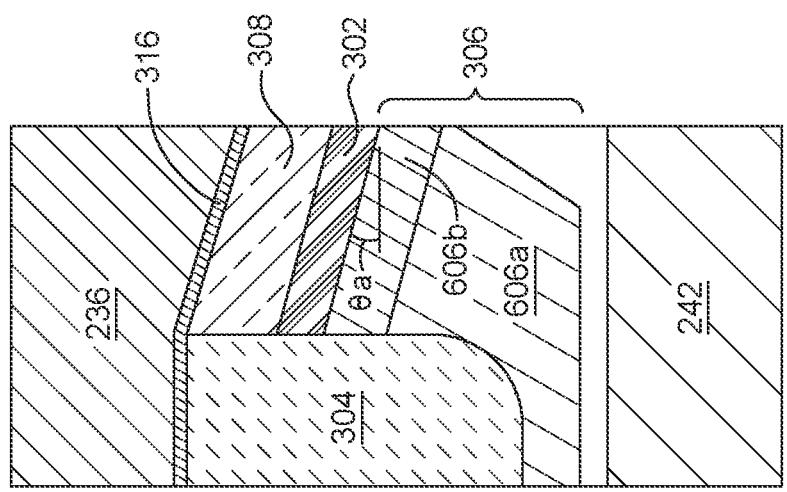

FIGS. 9A-9C illustrate cross-sectional views of the HAMR write head 300 of FIGS. 3A-3C through the line A-A in FIG. 3A having tilted dielectric gap layers 302, according to various embodiments. Aspects of the embodiments of FIGS. 9A-9C may be used in combination with one another. Furthermore, aspects of the embodiments of FIGS. 9A-9C may be used in combination with the embodiments of FIGS. 5A-5E, FIGS. 6A-6C, FIGS. 7A-7C, and/or 8A-8B.

In the embodiment of FIG. 9A, the dielectric gap layer 302 and the first metal layer 306 are tilted. For example, the tilt angle θa can be about 5 degrees to about 30 degrees. By tilting the dielectric gap layer 302 and/or the first metal layer 306, the heat flow from the first metal layer 306 to the thermal shunt 304 is increased and the NFT 284 temperature can be reduced.

In the embodiment of FIG. 9B, the dielectric gap layer 302 and the first metal layer 306 are tilted in multiple steps. For example, the angle θb of the portion of the dielectric gap layer 302 and/or the first metal layer 306 disposed adjacent to the thermal shunt 304 is about 5 degrees to about 20 degrees smaller than the angle θa of the portion disposed adjacent to the MFS, or the angle θb may be about 5 degrees to about 20 degrees larger than the angle θa.

In the embodiment of FIG. 9C, the top surface of the second metal layer 308 and the diffusion barrier layer 316 are tilted with the dielectric gap layer 302.

FIGS. 10A-10C illustrate cross-sectional views of the HAMR write head 300 of FIGS. 3A-3C through the line A-A in FIG. 3A, according to various embodiments. Aspects of the embodiments of FIGS. 10A-10C may be used in combination with one another. Furthermore, aspects of the embodiments of FIGS. 10A-10C may be used in combination with the embodiments of FIGS. 5A-5E, FIGS. 6A-6C, FIGS. 7A-7C, 8A-8B, and/or 9A-9C.

In the embodiment of FIG. 10A, the first sublayer 660a of the first metal layer 306 comprises a leading edge taper 1001 with an angle θ1 of about 5 degrees to about 45 degrees, which is fabricated in wafer process. The leading edge taper 1001 prevents the recording media from being heated by the background light generated at the bottom of the first metal layer 306, and further increases the thermal gradient in the recording media (i.e., improves the areal recording density). The first sublayer contacts the MFS in FIG. 10A, but it may be recessed from MSF by about 5 nm to about 30 nm to increase the thermal gradient further, like shown by the dotted line 1001b.

In the embodiment of FIG. 10B, instead of using the leading edge taper 1001, the first sublayer 606a of the first metal layer 306 and the second metal layer 308 may each be individually recessed from the MFS by etching the portions of the first sublayer 660a and the second metal layer 308 disposed at the MFS using ion milling during the slider fabrication process. The first sublayer 606a and the second metal layer 308 are recessed a depth D of about 5 nm to about 15 nm. In the ion milling process, the etching speed of the second metal layer 308 comprising a hard material may be slower than that of the first metal layer 306 comprising a soft material.

In the embodiment of FIG. 10C, the second sublayer 608b of the second metal layer 308 is also recessed from the MFS the depth D of about 5 nm to about 15 nm. The recess of the second sublayer 608b of the second metal layer 308 can reduce the damage due to interaction with the media surface.

By having an NFT comprising a dielectric gap layer disposed between a first metal layer and a second metal layer, where the first metal layer, the dielectric gap layer, and the second metal layer are all in contact with a thermal shunt, the first and second metal layers are connected through the thermal shunt, this increasing the field intensity during writer operations. Furthermore, the dielectric gap layer enhances the field at the MFS during write operations, while improving the optical efficiency, reducing the laser power, reducing the temperature of the NFT, reducing the reflectance of the NFT, reducing mode hop of the laser, and/or improving the overall lifetime of the NFT.

In one embodiment, a magnetic recording head comprises a main pole, a waveguide disposed adjacent to the main pole, a thermal shunt disposed between the main pole and the waveguide, the thermal shunt being recessed from a media facing surface (MFS), and a near field transducer (NFT) coupled between the main pole and the waveguide at the MFS, the NFT comprising: a first metal layer disposed adjacent to the waveguide, a dielectric gap layer disposed on and in contact with the first metal layer, and a second metal layer disposed on and in contact with the dielectric gap layer, wherein the first metal layer and the second metal layer are each disposed in contact with the thermal shunt.

The magnetic recording head further comprises a first insulating layer disposed between and in contact with the first metal layer and the waveguide, and a second insulating layer disposed between the main pole and the second metal layer, the second insulating layer being disposed in contact with the second metal layer. The dielectric gap layer comprises one or more materials selected from the group consisting of: $SiO_2$, $Al_2O_3$, silicon oxynitride (SiOxNy), where x and y are each a numeral greater than or equal to 1, aluminum silicon oxide ($Al_2O_3$—$SiO_2$), $MgF_2$, MgO, $Ta_2O_5$, $TiO_2$, SiN, and Ge doped $SiO_2$. The first metal layer comprises a different material than the second metal layer. The first metal layer and the second metal layer comprise a same material. The first metal layer and the second metal layer each individually comprises one or more materials selected from the group consisting of: Au, Ag, Cu, Al, Rh, Ir, Ru, Cr, Pt, Ti, Fe, Co, Ni, Pd, Be, Mo, W, ZrN, TiN, HfN, and NbN.

The dielectric layer has a width less than a width of the first metal layer and the second metal layer. The first metal layer comprises a first sublayer and a second sublayer, the first and second sublayers comprising different materials. The first sublayer of the first metal layer is disposed adjacent to the waveguide, and wherein the first sublayer of the first metal layer is recessed from the MFS. The first sublayer of the first metal layer is tilted at an angle of about 5 degrees to about 45 degrees with respect to the MFS. The first sublayer of the first metal layer a leading edge taper having an angle of about 5 degrees to about 45 degrees. The second sublayer comprises a first sublayer and a second sublayer, the second sublayer being disposed adjacent to the main pole. The second sublayer of the second metal layer is recessed from the MFS. The dielectric gap layer and the first metal layer are tilted at an angle of about 5 degrees to about 30 degrees with respect to the MFS. The second metal layer is tilted at an angle of about 5 degrees to about 30 degrees with respect to the MFS. A magnetic recording device comprises the magnetic recording head.

In another embodiment, a magnetic recording head comprises a main pole, a waveguide disposed adjacent to the main pole, a thermal shunt disposed between the main pole and the waveguide, the thermal shunt being recessed from a media facing surface (MFS), a first insulating layer disposed between the waveguide and the thermal shunt, a second insulating layer disposed between the main pole and the thermal shunt at the MFS, and a near field transducer (NFT) coupled between the first insulating layer and the second insulating layer at the MFS, the NFT comprising: a first metal layer disposed in contact with the first insulating layer, a dielectric gap layer disposed on and in contact with the first metal layer, and a second metal layer disposed on and in contact with the dielectric gap layer and the second insulating layer, wherein the first metal layer, the dielectric gap layer, and the second metal layer are each disposed in contact with the thermal shunt.

The dielectric gap layer has a thickness of about 5 nm to about 30 nm. The first metal layer has a thickness of about 50 nm to about 150 nm, and the second metal layer has a thickness of about 20 nm to about 100 nm. The thermal shunt comprises a material selected from the group consisting of: Au, Rh, Ir, Cu, Ag, Al, Ru, Cr, Pt, Ti, Fe, Co, Ni, Pd, Be, Mo, W, AlN alloys, and TiN alloys, and the first metal layer and the second metal layer each individually comprises one or more materials selected from the group consisting of: Au, Ag, Cu, Al, Rh, Ir, Ru, Cr, Pt, Ti, Fe, Co, Ni, Pd, Be, Mo, W, ZrN, TiN, HfN, and NbN. The dielectric gap layer comprises one or more materials selected from the group consisting of: $SiO_2$, $Al_2O_3$, silicon oxynitride (SiOxNy), where x and y are each a numeral greater than or equal to 1, aluminum silicon oxide ($Al_2O_3$—$SiO_2$), $MgF_2$, MgO, $Ta_2O_5$, $TiO_2$, SiN, and Ge doped $SiO_2$, and wherein the first insulating layer and the second insulating layer each individually comprises $SiO_2$ or $Al_2O_3$. The NFT is flared in shape, and wherein the thermal shunt has a different shape than the NFT.

A first adhesion layer is disposed between the first metal layer and the dielectric gap layer, and wherein a second adhesion layer is disposed between the second metal layer and the dielectric gap layer. A third adhesion layer is disposed on sidewalls of the first metal layer and on sidewalls of the second metal layer. The magnetic recording head further comprises a third metal layer disposed between the second metal layer and the main pole, the third metal layer being disposed in contact with the thermal shunt. The third metal layer has a width at the MFS greater than a width of the first and second metal layers. The third metal layer comprises one or more materials selected from the group consisting of: Au, Ag, Cu, Al, Rh, Ir, Ru, Cr, Pt, Ti, Fe, Co, Ni, Pd, Be, Mo, W, ZrN, TiN, HfN, and NbN. The third metal layer has a thickness less than a thickness of the first and second metal layers. The first metal layer comprises a first portion having a first width and a second portion having a second width less than the first width. The first width is about 50 nm to about 150 nm, and wherein the second width is about 1 nm to about 40 nm. A magnetic recording device comprises the magnetic recording head.

In yet another embodiment, a method of a magnetic recording head, comprises forming a near field transducer (NFT) by depositing a first metal layer, depositing a dielectric gap layer on and in contact with the first metal layer, and depositing a second metal layer on and in contact with the dielectric gap layer, removing portions of each of the first metal layer, the dielectric gap layer, and a second metal layer, wherein the removed portions of each of the first metal layer, the dielectric gap layer, and a second metal layer is at a location recessed from a media facing surface, and depositing a thermal shunt in the removed portions of each of the first metal layer, the dielectric gap layer, and a second metal layer such that the thermal shunt is disposed in contact with the first metal layer, the dielectric gap layer, and the second metal layer.

The method further comprises removing additional portions of each of the first metal layer, the dielectric gap layer, and a second metal layer such that the remaining portions of each of the first metal layer, the dielectric gap layer, and a second metal layer are flared in shape. The thermal shunt has a different shape than the NFT. The dielectric gap layer comprises one or more materials selected from the group consisting of: $SiO_2$, $Al_2O_3$, silicon oxynitride (SiOxNy), where x and y are each a numeral greater than or equal to 1, aluminum silicon oxide ($Al_2O_3$—$SiO_2$), $MgF_2$, MgO, $Ta_2O_5$, $TiO_2$, SiN, and Ge doped $SiO_2$, and wherein the first metal layer and the second metal layer each individually comprises one or more materials selected from the group consisting of: Au, Ag, Cu, Al, Rh, Ir, Ru, Cr, Pt, Ti, Fe, Co, Ni, Pd, Be, Mo, W, ZrN, TiN, HfN, and NbN. The dielectric gap layer and the first metal layer are tilted at an angle of about 5 degrees to about 30 degrees with respect to the MFS. The first metal layer and the second metal layer each individually has a trapezoidal shape. The first metal layer comprises one or more rounded corners.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording head, comprising:
    a main pole;
    a waveguide disposed adjacent to the main pole;
    a thermal shunt disposed between the main pole and the waveguide, the thermal shunt being recessed from a media facing surface (MFS); and
    a near field transducer (NFT) coupled between the main pole and the waveguide at the MFS, the NFT comprising:
        a first metal layer disposed adjacent to the waveguide;
        a dielectric gap layer disposed on and in contact with the first metal layer; and
        a second metal layer disposed on and in contact with the dielectric gap layer, wherein the first metal layer and the second metal layer are each disposed in contact with the thermal shunt.

2. The magnetic recording head of claim 1, further comprising:
    a first insulating layer disposed between and in contact with the first metal layer and the waveguide; and
    a second insulating layer disposed between the main pole and the second metal layer, the second insulating layer being disposed in contact with the second metal layer.

3. The magnetic recording head of claim 1, wherein the dielectric gap layer comprises one or more materials selected from the group consisting of: $SiO_2$, $Al_2O_3$, silicon oxynitride (SiOxNy), where x and y are each a numeral greater than or equal to 1, aluminum silicon oxide ($Al_2O_3$—$SiO_2$), $MgF_2$, MgO, $Ta_2O_5$, $TiO_2$, SiN, and Ge doped $SiO_2$.

4. The magnetic recording head of claim 1, wherein the first metal layer comprises a different material than the second metal layer.

5. The magnetic recording head of claim 1, wherein the first metal layer and the second metal layer comprise a same material.

6. The magnetic recording head of claim 1, wherein the first metal layer and the second metal layer each individually comprises one or more materials selected from the group consisting of: Au, Ag, Cu, Al, Rh, Ir, Ru, Cr, Pt, Ti, Fe, Co, Ni, Pd, Be, Mo, W, ZrN, TiN, HfN, and NbN.

7. The magnetic recording head of claim 1, wherein the dielectric layer has a width less than a width of the first metal layer and the second metal layer.

8. The magnetic recording head of claim 1, wherein the first metal layer comprises a first sublayer and a second sublayer, the first and second sublayers comprising different materials.

9. The magnetic recording head of claim 8, wherein the first sublayer of the first metal layer is disposed adjacent to the waveguide, and wherein the first sublayer of the first metal layer is recessed from the MFS.

10. The magnetic recording head of claim 9, wherein the first sublayer of the first metal layer a leading edge taper having an angle of about 5 degrees to about 45 degrees.

11. The magnetic recording head of claim 9, wherein the first sublayer of the first metal layer is tilted at an angle of about 5 degrees to about 45 degrees with respect to the MFS.

12. The magnetic recording head of claim 8, wherein the second sublayer comprises a first sublayer and a second sublayer, the second sublayer being disposed adjacent to the main pole.

13. The magnetic recording head of claim 12, wherein the second sublayer of the second metal layer is recessed from the MFS.

14. The magnetic recording head of claim 1, wherein the dielectric gap layer and the first metal layer are tilted at an angle of about 5 degrees to about 30 degrees with respect to the MFS.

15. The magnetic recording head of claim 14, wherein the second metal layer is tilted at an angle of about 5 degrees to about 30 degrees with respect to the MFS.

16. A magnetic recording device comprising the magnetic recording head of claim 1.

17. A magnetic recording head, comprising:
    a main pole;
    a waveguide disposed adjacent to the main pole;
    a thermal shunt disposed between the main pole and the waveguide, the thermal shunt being recessed from a media facing surface (MFS);
    a first insulating layer disposed between the waveguide and the thermal shunt;
    a second insulating layer disposed between the main pole and the thermal shunt at the MFS; and
    a near field transducer (NFT) coupled between the first insulating layer and the second insulating layer at the MFS, the NFT comprising:
        a first metal layer disposed in contact with the first insulating layer;
        a dielectric gap layer disposed on the first metal layer; and
        a second metal layer disposed on the dielectric gap layer and the second insulating layer, wherein the first metal layer, the dielectric gap layer, and the second metal layer are each disposed in contact with the thermal shunt.

18. The magnetic recording head of claim 17, wherein the dielectric gap layer has a thickness of about 5 nm to about 30 nm.

19. The magnetic recording head of claim 17, wherein the first metal layer has a thickness of about 50 nm to about 150 nm, and wherein the second metal layer has a thickness of about 20 nm to about 100 nm.

20. The magnetic recording head of claim 17, wherein the first metal layer and the second metal layer each individually comprises one or more materials selected from the group consisting of: Au, Ag, Cu, Al, Rh, Ir, Ru, Cr, Pt, Ti, Fe, Co, Ni, Pd, Be, Mo, W, ZrN, TiN, HfN, and NbN.

21. The magnetic recording head of claim 17, wherein the dielectric gap layer comprises one or more materials selected from the group consisting of: $SiO_2$, $Al_2O_3$, silicon oxynitride (SiOxNy), where x and y are each a numeral greater than or equal to 1, aluminum silicon oxide ($Al_2O_3$—$SiO_2$), $MgF_2$, MgO, $Ta_2O_5$, $TiO_2$, SiN, and Ge doped $SiO_2$, and wherein the first insulating layer and the second insulating layer each individually comprises $SiO_2$ or $Al_2O_3$.

22. The magnetic recording head of claim 17, wherein the NFT is flared in shape, and wherein the thermal shunt has a different shape than the NFT.

23. The magnetic recording head of claim 17, wherein a first adhesion layer is disposed between the first metal layer and the dielectric gap layer, and wherein a second adhesion layer is disposed between the second metal layer and the dielectric gap layer.

24. The magnetic recording head of claim 17, wherein a third adhesion layer is disposed on sidewalls of the first metal layer and on sidewalls of the second metal layer.

25. The magnetic recording head of claim 17, further comprising a third metal layer disposed between the second metal layer and the main pole, the third metal layer being disposed in contact with the thermal shunt.

26. The magnetic recording head of claim 25, wherein the third metal layer has a width at the MFS greater than a width of the first and second metal layers.

27. The magnetic recording head of claim 25, wherein the third metal layer comprises one or more materials selected from the group consisting of: Au, Ag, Cu, Al, Rh, Ir, Ru, Cr, Pt, Ti, Fe, Co, Ni, Pd, Be, Mo, W, ZrN, TiN, HfN, and NbN.

28. The magnetic recording head of claim 25, wherein the third metal layer has a thickness less than a thickness of the first and second metal layers.

29. The magnetic recording head of claim 17, wherein the first metal layer comprises a first portion having a first width and a second portion having a second width less than the first width.

30. The magnetic recording head of claim 29, wherein the first width is about 50 nm to about 150 nm, and wherein the second width is about 1 nm to about 40 nm.

31. The magnetic recording head of claim 17, wherein the thermal shunt comprises a material selected from the group consisting of: Au, Rh, Ir, Cu, Ag, Al, Ru, Cr, Pt, Ti, Fe, Co, Ni, Pd, Be, Mo, W, AlN alloys, and TiN alloys.

32. A magnetic recording device comprising the magnetic recording head of claim 17.

\* \* \* \* \*